(12) United States Patent
Johl et al.

(10) Patent No.: US 6,978,457 B1
(45) Date of Patent: Dec. 20, 2005

(54) METHOD AND SYSTEM INCREASING PERFORMANCE SUBSTITUTING FINITE STATE MACHINE CONTROL WITH HARDWARE-IMPLEMENTED DATA STRUCTURE MANIPULATION

(75) Inventors: Manraj Singh Johl, Roseville, CA (US); Joseph Harold Steinmetz, Rocklin, CA (US); Matthew Paul Wakeley, Roseville, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/494,817

(22) Filed: Jan. 31, 2000

(51) Int. Cl.[7] .............................. G06F 7/00; G06F 3/00; G06F 9/46
(52) U.S. Cl. ...................... 718/100; 707/101; 707/102; 719/315
(58) Field of Search . 718/1–108; 710/1; 707/100–102; 719/315

(56) References Cited

U.S. PATENT DOCUMENTS

| | | | | |
|---|---|---|---|---|
| 5,758,182 A | * | 5/1998 | Rosenthal et al. ............. | 710/3 |
| 5,809,328 A | * | 9/1998 | Nogales et al. ................ | 710/5 |
| 5,815,649 A | * | 9/1998 | Utter et al. ..................... | 714/6 |
| 5,878,258 A | | 3/1999 | Pizi et al. | |
| 5,949,979 A | * | 9/1999 | Snow et al. ................. | 710/302 |
| 6,065,087 A | * | 5/2000 | Keaveny et al. ............ | 710/315 |
| 6,185,620 B1 | | 2/2001 | Weber et al. | |

FOREIGN PATENT DOCUMENTS

| | | |
|---|---|---|
| EP | 0 942368 | 2/1999 |
| WO | WO 01/29664 | 4/2001 |

* cited by examiner

*Primary Examiner*—Meng-Al T. An
*Assistant Examiner*—Kenneth Tang

(57) ABSTRACT

A method for replacing finite state machine hardware implementations of controllers and controller subcomponents with implementations based on manipulating contexts stored within common data structures, such as linked lists, and an outbound sequence manager subcomponent of a fibre channel interface controller implemented by this method. A state transition diagram is analyzed to define managers within the controller, along with commands received by, and generated by, each manager. Data structures are chosen for each manager to store contexts representing tasks currently operated on by the manager. An additional manger and interface are designed for a data-structure-manipulation manager. Finally, the operations performed by the managers are defined and implemented, with sequencing of operations controlled by transfer of contexts between data structures by the data-structure-manipulation manager.

18 Claims, 16 Drawing Sheets

Comments
Context 1 complete
Context 1 on Timer
List to wait for
credit.

METHOD AND SYSTEM INCREASING PERFORMANCE SUBSTITUTING FINITE STATE MACHINE CONTROL WITH HARDWARE-IMPLEMENTED DATA STRUCTURE MANIPULATION

TECHNICAL FIELD

The present invention relates to implementation of hardware control logic, and, in particular, to a method for efficiently implementing control logic using data structure management rather than finite state machines, and to a controller component of a fibre channel interface controller incorporating list data structure management in place of finite state machines.

BACKGROUND OF THE INVENTION

The fibre channel ("FC") is an architecture and protocol for a data communications network for interconnecting computers and peripheral devices. The FC supports a variety of upper-level protocols, including the small computer systems interface ("SCSI") protocol. A computer or peripheral device is linked to the network through an FC port and an FC link comprising copper wires or optical fibres, the computer or peripheral device, FC port, and FC link together referred to as an "FC node." An FC port includes a transceiver and an interface controller, and the computer or peripheral device in which the FC port is contained is called a "host." Hosts generally contain one or more processors, referred to as the "host processor" in the current application. The FC port exchanges data with the host via a local data bus, such as a peripheral computer interface ("PCI") bus. The interface controller conducts lower-level protocol exchanges between the fibre channel and the computer or peripheral device in which the FC port resides.

An interface controller within an FC port serves essentially as a transducer between the serial receiver and transmitter components of the FC port and the host processor of the FC node in which the FC port is contained. The interface controller is concerned with, on the input side, assembling serially-encoded data received from the receiver component into ordered sets of bytes, assembling a majority of the ordered sets of bytes into basic units of data exchange, called "FC frames," and passing the FC frames, along with status information, to the host processor within the context of larger collections of FC frames, called FC sequences and FC exchanges. On the output side, the interface controller accepts host memory buffer references and control information from the host processor, transforms them into FC frames, within higher-level contexts of FC sequences and FC exchanges, and provides the FC frames to the transmitter component of the FC port for serial transmission to the FC. The interface controller also exchanges lower-level control messages with remote nodes via the FC that are used for configuring the FC, maintaining state within FC nodes, establishing temporary paths between nodes, arbitrating control of FC loops, acknowledging receipt of FC data frames, and extending data transfer credits to remote nodes, among other things.

The interface controller communicates with the host processor through a set of host memory-based data structures and through a number of control registers accessible to both the interface controller and the host processor via a local bus, such as a PCI bus. At any given instant, the interface controller may be handling outgoing FC frames associated with different FC sequences, and may be also handling inbound FC frames from the FC associated with a number of FC sequences. The interface controller uses internal caches to cache information from the host memory-based data structures with which the interface controller communicates with the host processor.

The interface controller plays an analogous function within an FC port as that played by a computer processor in a multi-tasking operating system environment. The interface controller handles many different events concurrently with extremely dynamic patterns of state changes and information flow. The state of an interface controller is maintained in a number of different dynamic data structures and queues, generally stored within host memory, and accessible to both the interface controller and the host. The state of each currently active FC exchange and FC sequence is maintained in these data structures, as well as descriptors that reference incoming and outgoing frames, completion messages for write and read operations, and other such information.

I/O operations may be conducted within the context of a SCSI I/O operation embedded within the FC protocol. An I/O operation is initiated by an initiator node in order to read data from, or write data to, a target node. At the conclusion of a write or read operation ("I/O operation"), the initiator node generally receives a FC response frame from the target node, whether or not the I/O operation successfully completes. This FC response frame is received by the interface controller from the FC, the data contents of the FC response frame are transferred to a buffer in host memory, and a completion notice is placed into a separate completion queue in host memory by the interface controller. Thus, data is sent from the interface controller to two different host memory locations upon reception by the initiating node of a response FC frame.

In FC controllers, as in operating systems and other real-time device controllers, queues are employed for buffering output data and input data. In a typical FC controller, inbound frames are received by the FC interface controller from the transceiver component of the FC node that contains the FC interface controller and placed into an inbound first-in-first-out ("FIFO") queue within the FC interface controller. Outbound frames are created by the FC controller in response to queuing, by the host computer, of an I/O request into a host memory queue. The FC controller creates FC frames and queues them to an outbound FIFO queue.

FC frames include FC data frames and FC link-control frames. One type of FC link-control frame is an acknowledgement ("ACK") frame. An FC node sends ACK frames to remote nodes from which the FC node has received FC data frames in order to acknowledge receipt of the FC data frames. FC nodes employ an end-to-end ("EE") credit management strategy in which an FC node must obtain credits prior to transmitting FC frames to a remote node. In addition to acknowledging receipt of an FC frame, ACK frames are used to transfer credits to a remote node to allow the remote node to send additional frames to an FC node.

An outbound sequence manager ("OSM") component of an interface controller is responsible for receiving outbound descriptor blocks ("ODBs") that describe FC sequences to be transmitted to remote FC nodes, constructing the FC frames for the FC sequences using references to host memory data within the ODB describing the FC sequences, and queuing the FC frames to an outbound FIFO queue. In addition, the OSM receives ACK frames form an inbound FIFO that allow additional FC frames to be sent to remote FC nodes. The OSM interacts with host memory, a component that provides ODBs, a component that manages inbound FC frames, and the outbound FIFO, internally maintaining context information about a number of active FC sequences, receiving and processing link control frames, and creating FC frames and queuing the FC frames to the outbound FIFO manager.

The OSM receives many different types of signals and data and outputs various types of signals and FC frames while internally managing a number of active contexts. Current OSM implementations involve multiple finite state machines ("FSMs"). However, because of the complexity of signal processing, data processing, and data generation, the performance of current OSMs is negatively impacted by the complexity of the FSMs required to track and integrate many asynchronous control signals and by the complex intercommunications needed between FSMs in order to maintain overall state information across multiple FSMs. Moreover, as the number and complexity of FSMs increases, it becomes increasingly difficult to design, test, and verify correct operation of multiple FSMs. Designers and manufacturers of complex control hardware, such as OSMs, have recognized a need for implementing control hardware more simply and more efficiently in order to decrease latency of operation, to increase throughput, or, in other words, the rate of decision making and data generation, and to decrease the complexity of design and verification.

SUMMARY OF THE INVENTION

One embodiment of the present invention provides a method for implementing complex hardware controllers and controller components of complex hardware controllers using data, structure manipulation rather than a number of intercommunicating FSMs. The state transition diagram for the controller or controller component is analyzed in order to divide controller functionality between a number of sub-controllers, or managers, and in order to specify data and control signal interactions between the managers. Each manager is provided with a data structure for storing contexts. A context describes a task or thread that is processed by the controller and is a fundamental unit of task management for the controller. Processing of a task is accomplished by operations conducted on the behalf of the task by mangers. The sequence of operations applied to a task is controlled, in part, by transfer of the task between data structures of different managers. The operations applied to a task by the controller can be described by a pathway through the managers of the controller taken by the task, and by the operations applied to the task by each manager while the task is present within the manager's local data structure. For time-critical and efficient control, multiple contexts may be concurrently transferred between managers during a single clock cycle.

When the method is applied to designing an OSM component of an FC interface controller, each manager is provided with a list data structure in which contexts for active sequences managed by the managers are maintained. In response to external control signals and internally generated control signals representing state transitions, contexts are transferred between the lists managed by the different managers. Multiple context transfers may occur during a single clock cycle. Context transfers are associated with commands issued by different managers. During a single clock cycle, each manager may issue a single command. A centralized list manager ("CLM") is provided to manage all list data structures associated with other managers and to execute the various commands issued by managers that result in transfer of a context from one list data structure to another. A new context is generated for each new ODB defining an FC sequence to be transmitted that is received by the OSM and, upon a terminal error or successful completion of transmission of the sequence, a signal is generated to an external component that eventually results in the queuing of a notification to the host computer of either an error indication or a successful completion indication, while the context corresponding to the successfully transmitted or terminated sequence is transferred to a free list for reuse upon reception of a subsequent ODB.

For different types of hardware controllers, different types of partitioning of functionality between different numbers and types of managers may be desirable. In addition, data structures other than linked lists may be appropriate for maintaining contexts within different managers. Any of the common data structures employed in software programming may be implemented for maintaining contexts within a manager, including FIFO queues, first in/last out queues, stacks, circular queues, binary trees and other types of acyclic graphs, and many others. The method of the present invention involves choosing appropriate partitionings of functionality, developing managers for each partition, choosing appropriate data structures for storing contexts within each manager, and specifying and implementing all possible transitions required for moving contexts between managers in order to generate appropriate output signals and output data based on received signals and received data. This method avoids complex multiple-FSM implementations of hardware controllers.

DETAILED DESCRIPTION OF THE INVENTION

Figure 1:
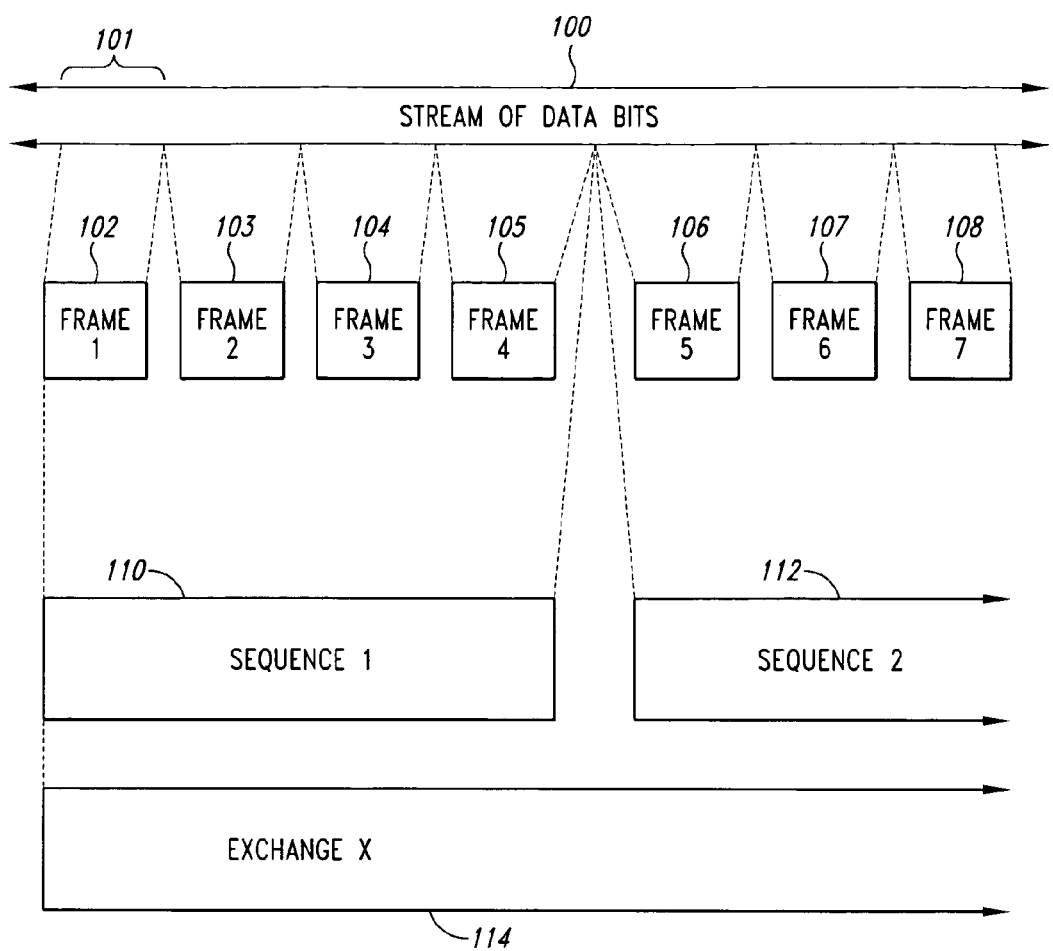
FIG. 1 illustrates a simple hierarchy by which data is organized, in time, for transfer through an FC network.

The present invention will be described below in four subsections. The first three subsections provide details about the FC, the FC protocol, FC interface-controller architecture, and the host memory interface between the interface controller and the host processor of an FC node. The fourth subsection provides a description of one embodiment of the present invention.

Fibre Channel

The Fibre Channel ("FC") is defined by, and described in, a number of ANSI Standards documents, including: (1) Fibre Channel Physical and Signaling Interface ("FC-PH"), ANSI X3.230-1994, ("FC-PH-2), ANSI X3.297-1997; (2) Fibre Channel—Arbitrated Loop ("FC-AL-2"), ANSI X3.272-1996; (3) Fibre Channel—Private Loop SCSI Direct Attached ("FC-PLDA"); (4) Fibre Channel—Fabric Loop Attachment ("FQ-FLA"); (5) Fibre Channel Protocol for SCSI ("FCP"); (6) Fibre Channel Fabric Requirements ("FC-FG"), ANSI X3.289:1996; and (7) Fibre Channel 10-Bit Interface. These standards documents are under frequent revision. Additional Fibre Channel System Initiative ("FCSI") standards documents include: (1) Gigabaud Link Module Family ("GLM"), FCSI-301; (2) Common FC—PH Feature Sets Profiles, FCSI-101; and (3) SCSI Profile, FCSI-201. These documents may be found at the World Wide Web Internet page having the following address:

"http://www.fibrechannel.com"

The following description of the FC is meant to introduce and summarize certain of the information contained in these documents in order to facilitate discussion of the present invention. If a more detailed discussion of any of the topics introduced in the following description is desired, the above-mentioned documents may be consulted.

In the following discussion, "FC" is used as an adjective to refer to the general Fibre Channel architecture and protocol, and is used as a noun to refer to an instance of a Fibre Channel communications medium. Thus, an FC (architecture and protocol) port may receive an FC (architecture and protocol) sequence from the FC (communications medium).

The FC protocol is an architecture and protocol for data communications between FC nodes, generally computers, workstations, peripheral devices, and arrays or collections of peripheral devices, such as disk arrays, interconnected by one or more communications media. Communications media include shielded twisted pair connections, coaxial cable, and optical fibers. An FC node is connected to a communications medium via at least one FC port and FC link. An FC port is an FC host adapter or FC controller that shares a register and host memory interface with the host processing components of the FC node, and that implements, in hardware and firmware, the lower levels of the FC protocol. The FC host generally exchanges data and control information with the FC port using shared data structures in shared memory and using control registers in the FC port. The FC port includes serial transmitter and receiver components coupled to a communications medium via an FC link that comprises electrical wires or optical strands.

The FC is a serial communications medium. Data is transferred one bit at a time at extremely high transfer rates. FIG. 1 illustrates a very simple hierarchy by which data is organized, in time, for transfer through an FC network. At the lowest conceptual level, the data can be considered to be a stream of data bits 100. The smallest unit of data, or grouping of data bits, supported by an FC network is a 10-bit character that is decoded by FC port as an 8-bit character. FC primitives are generally composed of four 10-bit characters or bytes. Certain FC primitives are employed to carry control information exchanged between FC ports. The next level of data organization, a fundamental level with regard to the FC protocol, is a frame. Seven frames 102–108 are shown in FIG. 1. A frame may be composed of between 36 and 2,148 bytes of data, depending on the nature of the data included in the frame. The first FC frame, for example, corresponds to the data bits of the stream of data bits 100 encompassed by the horizontal bracket 101. The FC protocol specifies a next higher organizational level called the sequence. A first sequence 110 and a portion of a second sequence 112 are displayed in FIG. 1. The first sequence 110 is composed of frames one through four 102–105. The second sequence 112 is composed of frames five through seven 106–108 and additional frames that are not shown. The FC protocol specifies a third organizational level called the exchange. A portion of an exchange 114 is shown in FIG. 1. This exchange 114 is composed of at least the first sequence 110 and the second sequence 112 shown in FIG. 1. This exchange can alternatively be viewed as being composed of frames one through seven 102–108, and any additional frames contained in the second sequence 112 and in any additional sequences that compose the exchange 114.

The FC is a full duplex data transmission medium. Frames and sequences can be simultaneously passed in both directions between an originator, or initiator, and a responder, or target. An exchange comprises all sequences, and frames within the sequences, exchanged between an initiator, or originator, and a responder, or target, during a single I/O transaction, such as a read I/O transaction or a write I/O transaction. The FC protocol is designed to transfer data according to any number of higher-level data exchange protocols, including the Internet protocol ("IP"), the Small Computer Systems Interface ("SCSI") protocol, the High Performance Parallel Interface ("HIPPI"), and the Intelligent Peripheral Interface ("IPI"). The standard adaptation of SCSI protocol to fibre channel is subsequently referred to in this document as "FCP." Thus, the FC can support a master-slave type communications paradigm that is characteristic of the SCSI bus and other peripheral interconnection buses, as well as the relatively open and unstructured communication protocols such as those used to implement the Internet. The SCSI bus architecture concepts of an initiator and target are carried forward in the FCP, designed, as noted above, to encapsulate SCSI commands and data exchanges for transport through the FC. The discussion below will relate only to the FCP protocol on the FC and to the SCSI protocol discussed above.

FC Protocol

Figure 2:
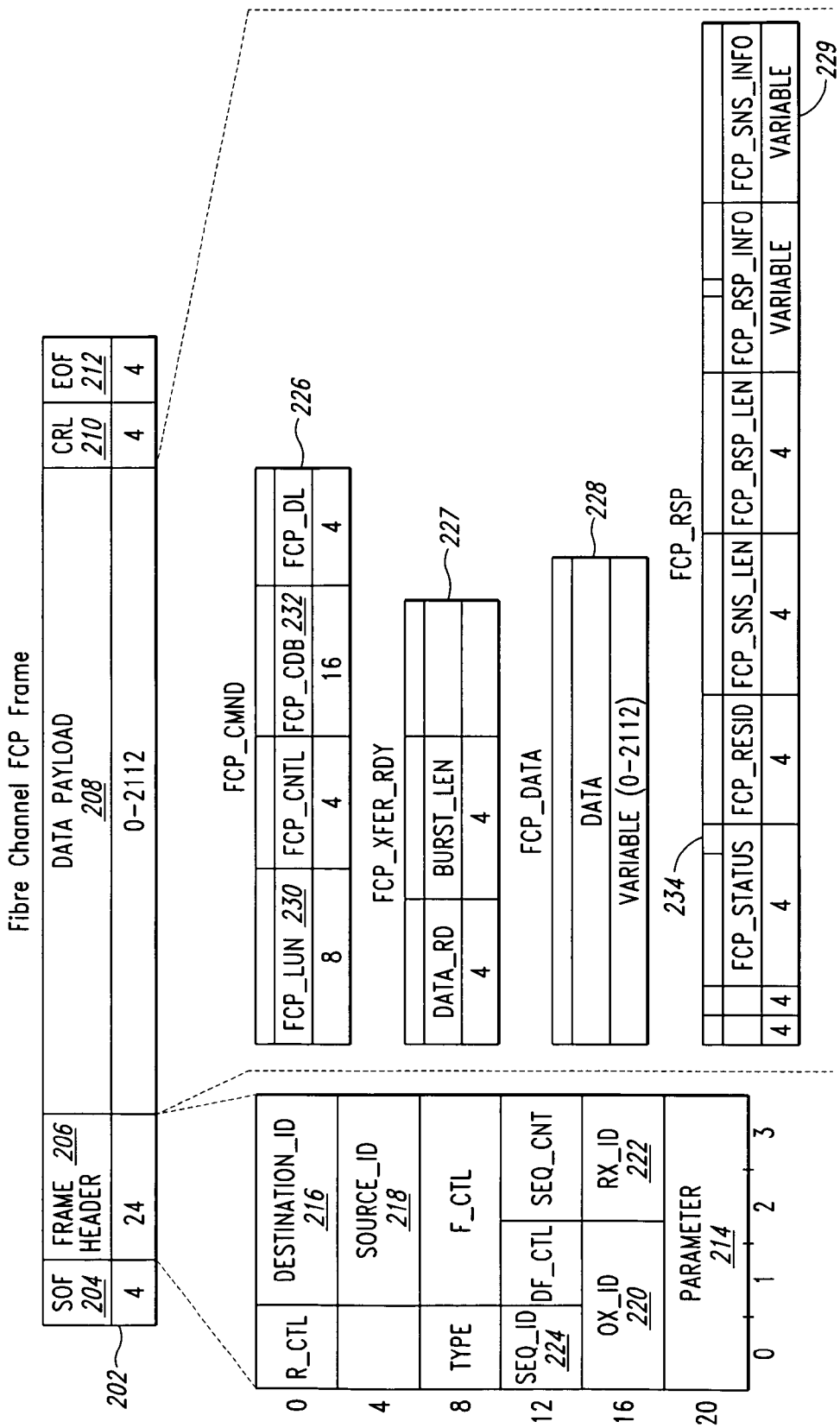
FIG. 2 illustrates the conceptual contents of an FC frame.

FIG. 2 illustrates the conceptual contents of an FC frame. The FC frame 202 comprises five high-level sections 204, 206, 208, 210 and 212. The first high-level section, called the start-of-frame delimiter 204, comprises 4 bytes that mark the beginning of the frame. The next high-level section, called frame header 206, comprises 24 bytes that contain addressing information, sequence information, exchange information, and various control flags. A more detailed view of the frame header 214 is shown expanded from the FC frame 202 in FIG. 2. The destination ID 216 is a 24-bit FC address indicating the destination port for the frame. The source ID 218 is a 24-bit address that indicates the port that transmitted the frame. The originator ID, or OX_ID 220, and the responder ID 222, or IX_ID, together compose a 32-bit exchange ID that identifies the exchange to which the frame belongs. The sequence ID 224 identifies the sequence to which the frame belongs.

The next high-level section 208, called the data payload, contains the actual data packaged within the FCP frame. The data payload can be formatted according to four basic types of data payload layouts 226–229. The first of these layouts 226, called the FCP_CMND, is used to send a SCSI command from an initiator to a target. The FCP_LUN field 228 comprises a 8-byte address that specifies a particular SCSI adapter, a target device associated with that SCSI adapter, and a logical unit number corresponding to a physical device associated with the specified target SCSI device. An SCSI command is contained within the 16-byte field FCP_CDB 230. The second type of data payload format 227 shown in FIG. 2 is called the FCP_XFERRDY layout. This data payload format is used to transfer a proceed command from the target to the initiator when the target is prepared to begin receiving or accepting data. The third type of data payload format 228 shown in FIG. 2 is the FCP_DATA format, used for transferring the actual data that is being read or written as a result of execution of an I/O transaction. The final data payload layout 229 shown in FIG. 2 is called the FCP_RSP layout, used to transfer a SCSI status byte 234, as well as other FCP status information, from the target back to the initiator upon completion of the I/O transaction. In the following discussion, an FC frame containing an FCP_CMND, FCP_XFER_RDY, FCP_DATA, or FCP_RSP data payload will be referred to as an FCP_CMND frame, FCP_XFER_RDY frame, FCP_DATA frame, or FCP_RSP frame, respectively.

The FC protocol supports two major types of FC frames. The first type is the FC data frame. FC data frames include FC link_frames, FC device_frames, and FC video_frames. FC data frames are all characterized by having data payload fields (208 in FIG. 2) that contain data. Thus, the FCP_CMND, FCP_XFER_RDY, FCP_DATA, and FCP_RSP frames, described above, are examples of FC data frames.

A second type of FC frame is the link-control frame. Link-control frames include ACK frames, link_response frames, and link_command frames. Link_control frames are characterized by having no data payload field. Link_response frames are generally sent to indicate unsuccessful delivery of one or more FC data frames. Link-control frames are employed for low-level functions, such as reset functions. As described above, ACK frames are used, among other things, to acknowledge successful receipt of FC data frames as well as to transfer credits to a remote node to allow the remote node to send additional FC data frames.

Figure 3:
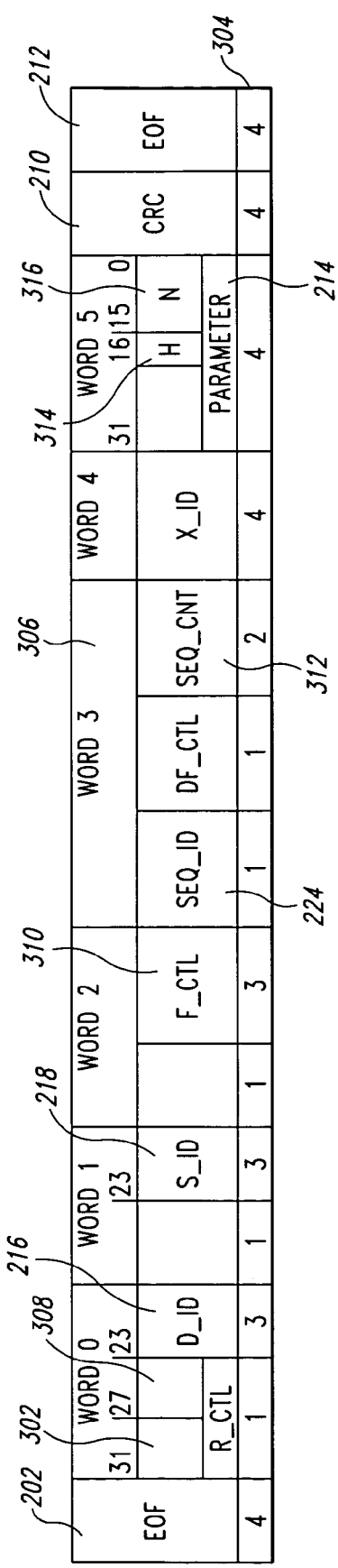
FIG. 3 shows the layout of an ACK frame.

FIG. 3 shows the layout of an ACK frame. In FIG. 3, the fields of an ACK frame are laid out in byte order. The lowest row 304 in FIG. 3 indicates the number of bytes within the field, and the upper row 306 indicates word boundaries and, for certain fields, bit numbering within the word. Fields previously shown in FIG. 2 are labeled with the same numerical label used in FIG. 2. FC link-control frames are distinguished from FC data frames by the contents of the high four bits of the R_CTL fields 302. When these four bits contain the binary value "1100," the frame is a link-control frame; otherwise, the frame is an FC data frame. The next-lowest four bits of the R_CTL field 308 indicate the type of link-control frame. The FC supports three different types of ACK frames: (1) ACK_1, an acknowledgement of a single FC data frame; (2) ACK_N, an acknowledgement of n FC frames; and (3) ACK_0, an acknowledgement of all FC data frames within an FC sequence. The second-highest four bits of the R_CTL field 308 have the binary value "0001" for ACK_0 and ACK_N-type ACK frames and the binary value "0000" for ACK_1-type ACK frames. The D_ID field 216 identifies the source of the FC data frame or FC data frames for which the ACK frame is an acknowledgement and the S_ID field 218 identifies the node sending the ACK frame. The SEQ_ID field 224 identifies the sequence that includes the FC data frame being acknowledged, and the SEQ_CNT field 312 indicates the lowest-number FC data frame in the sequence for which the ACK frame is an acknowledgement. The PARAMETER field 214 contains an H bit 314 that indicates whether or not acknowledgements for all previously transmitted FC data frames have been sent or, in other words, if FC data frame delivery has succeeded up to the point in the FC sequence occupied by the highest-order FC data frame for which the ACK frame serves as acknowledgement, and the lowest 16 bits of the PARAMETER field 214 comprise an N field 316 that contains the number of FC data frames being acknowledged by the ACK frame, or, for ACK_0-type ACK frames, the value "0." For ACK_1-type ACK frames, the value of the N field 316 is "1."and for ACK_N-type ACK frames, the value is n.

Figure 4A:
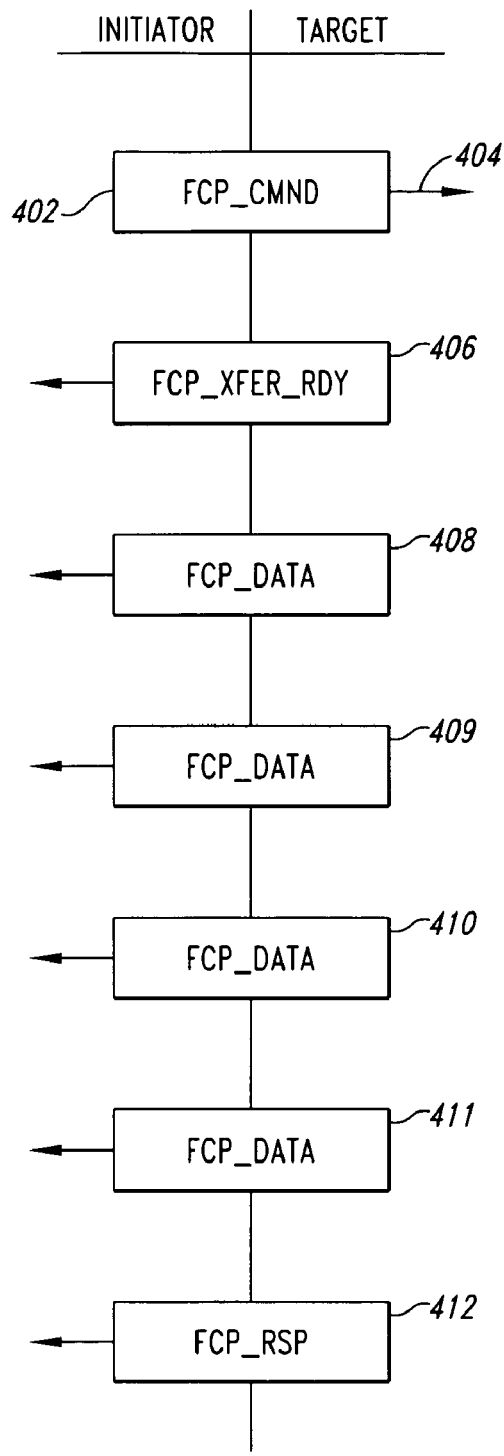
FIGS. 4A and 4B illustrate a generalized sequence of FC frames exchanged between an initiator node and a target node during a read I/O operation and a write I/O operation, respectively.
Figure 4B:
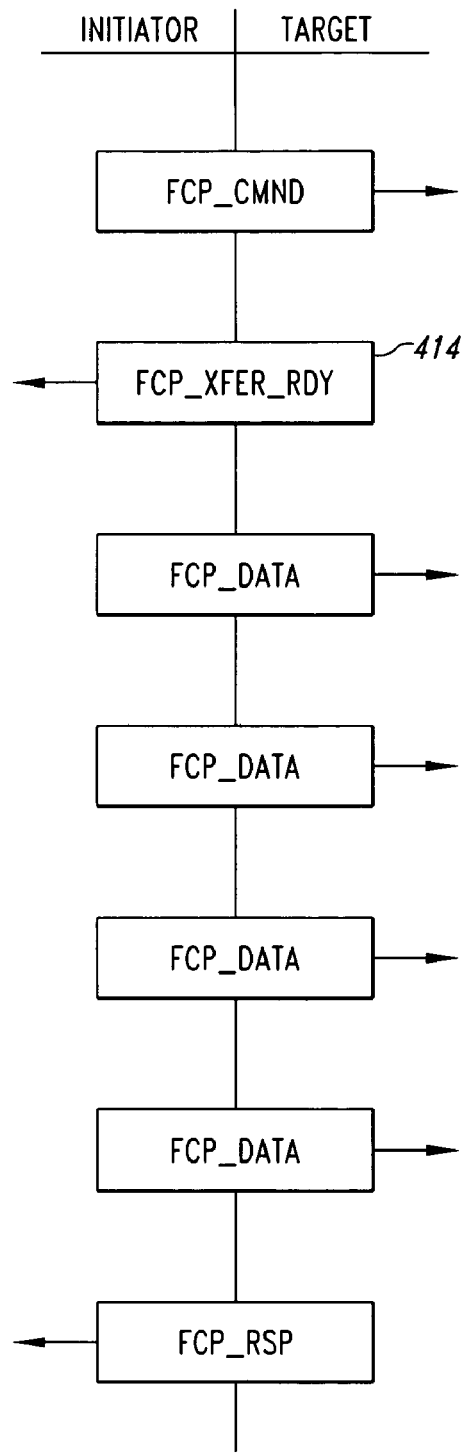

FIGS. 4A and 4B illustrate a generalized sequence of FC frames exchanged between an initiator node and a target node during a read I/O operation and a write I/O operation, respectively. In both figures, FC frames are represented as rectangles, such as FC frame 402, and arrows, such as arrow 404, indicate the direction that the FC frame is sent. Arrows pointing towards the right, such as arrow 404, indicate that an FC frame is transmitted from an initiator node to a target node, and arrows pointing to the left indicate that an FC frame is transmitted from a target node to an initiator node. The sequence of FC frames in both figures proceeds from an initial FC frame, at the top of the figures, to a final FC frame, at the bottom of the figures, in time order.

A read I/O operation is initiated when an initiator node sends an initial FC sequence comprising a FCP_CMND frame 402 through the FC to the target node. After the target node receives the FCP_CMND frame, and prepares itself for the read operation, the target node may send a second FC sequence comprising an FCP_XFERRDY frame 406 back to the initiator node to indicate that data transmission can now proceed. This sending of an FCP_XFERRDY frame by the target node is optional, in the case of a read I/O operation. The target node then reads data from a physical device and transmits that data as a number of FCP_DATA frames 408–411, together composing a third sequence of the exchange corresponding to the I/O read transaction, to the initiator node through the FC. When all the data has been transmitted, and the target node packages a status byte into an FCP_RSP frame 412 and transmits the FCP_RSP frame back to the initiator node through the FC. This completes the read I/O operation.

FIG. 4B shows, in similar fashion to FIG. 4A, an example of FC frames exchanged during a write I/O transaction between an initiator node and a target node. FIG. 4B differs from FIG. 4A only in the fact that, during a write I/O operation, the FCP_DATA frames are transmitted from the initiator node to the target node over the FC and the FCP_XFERRDY FC frame 414 sent from the target node to the initiator node is not optional, as in the case of the read I/O operation, but is instead mandatory.

FC Interface-Controller Architecture

Figure 5:
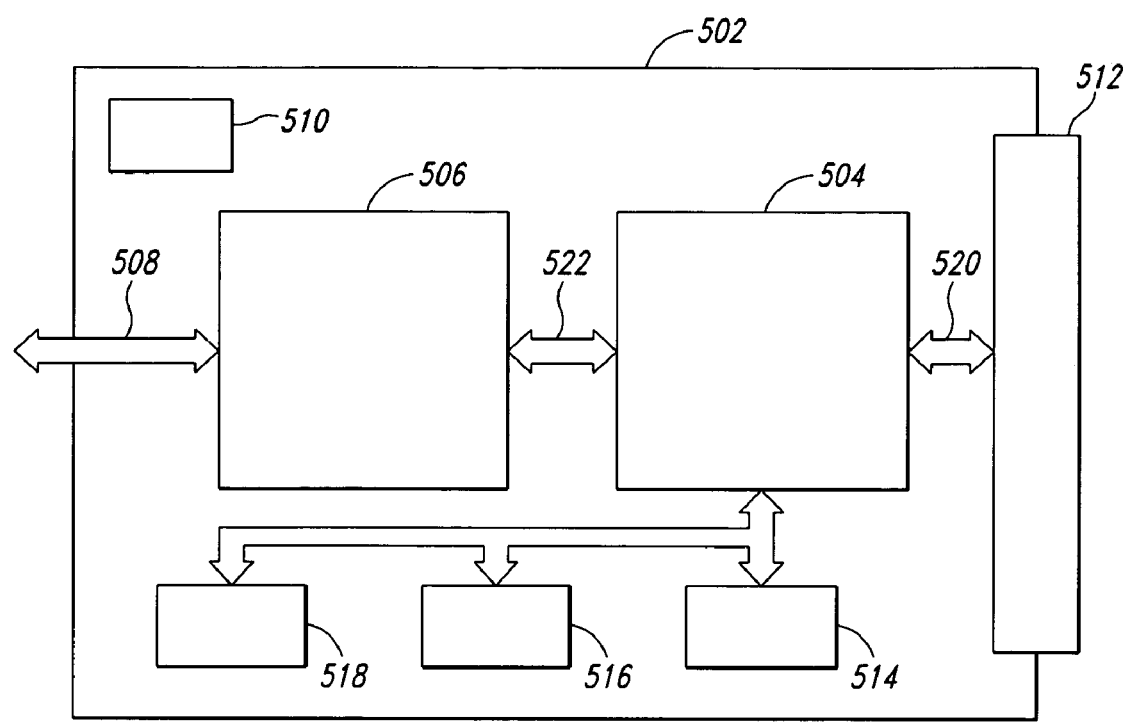
FIG. 5 shows a typical FC interface controller incorporated into a typical FC/PCI host adapter.

FIG. 5 shows a typical FC Interface Controller ("FCIC") incorporated into a typical FC/PCI host adapter. The FC/PCI host adapter 502 comprises the FCIC 504, a transceiver chip 506, an FC link 508, a clock 510, a backplane connector 512, and, optionally, a boot flash ROM 514, a local synchronous static random access memory ("RAM") 516, and a local memory 518. The FC/PCI host adapter 502 communicates with the processor or processors of an FC node via the backplane connector 512 and a PCI bus within the FC node to which the processor or processors are coupled. The FCIC 504 is coupled to the backplane connector 512 via a PCI interface 520. The FCIC sends and receives FC frames to and from an FC via a 10-bit interface 522 that couples the FCIC to the transceiver chip 506, which is, in turn, coupled to the FC via the FC link 508. The clock 510 interfaces to various FC host adapter components to provide timing signals for synchronizing operations of the components. The FC host adapter 502 may serve, in terms of the previous discussion, as an FC port, and the FC host adapter 502 together with the computer system to which it is coupled via the backplane connector 512, compose an FC node that may be connected via the FC link 508 to the FC.

Figure 6:
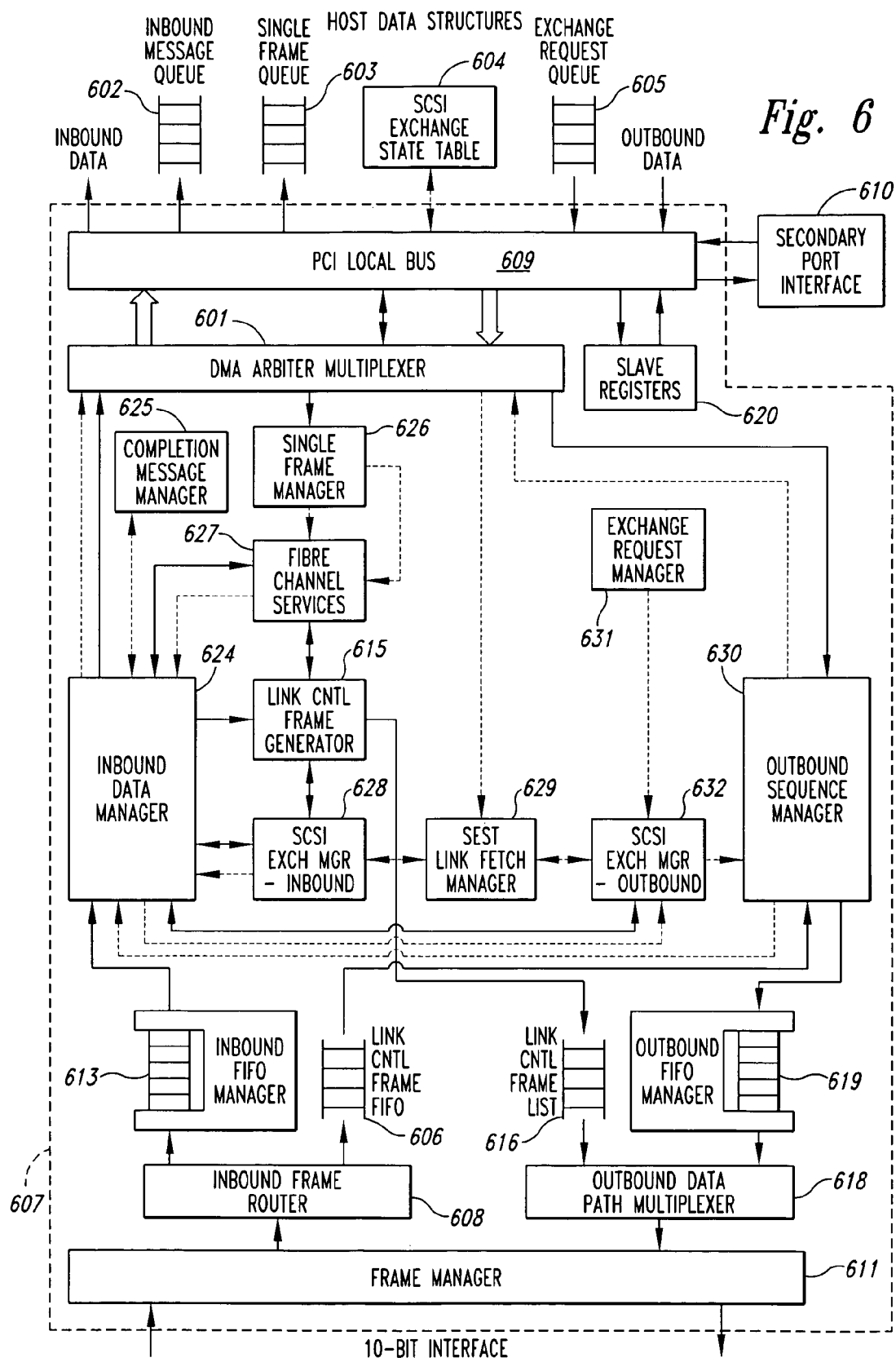
FIG. 6 shows a block diagram of a typical FC interface controller and the memory-based data structure interface between the typical FC interface controller and a host.

FIG. 6 shows a block diagram description of a typical FC interface controller and the memory-based data structure interface between a typical FC interface controller and a host. Memory-based data structures, including the inbound message queue ("IMQ") 602, the single frame queue ("SFQ") 603, the SCSI exchange state table ("SEST") 604, and the exchange request queue ("ERQ") 605 are maintained in a memory component of the host processor accessible to the FCIC via the PCI bus 609. In FIG. 6, the FCIC 607 is represented as being combined with the backplane connector (512 in FIG. 5) and PCI bus 609. A DMA arbiter multiplexer ("DAM") 601 manages multiple internal direct memory access ("DMA") requests to either the PCI bus 609 or to a secondary port interface 610 that allows access to the boot flash ROM (514 in FIG. 5), the local synchronous static RAM (516 in FIG. 5), and the local memory (518 in FIG. 5), if those additional storage components are included. The FCIC interfaces with a transceiver chip (506 in FIG. 5) via a 10 bit/8 bit decoder and 8 bit/10 bit encoder that together comprise a 10-bit interface to which a frame manager 611 interfaces. The frame manager 611 receives FC frames for transmission to the transceiver chip (506 in FIG. 5) from the FCIC via an outbound FIFO manager 619 and outbound data path multiplexer 618 and receives a stream of data bits from the transceiver chip (506 in FIG. 5) via the 10 bit/8 bit decoder interface, processes the received data bits into FC frames, and forwards the FC frames to an inbound frame router 608 that, in turn, forwards FC Data frames to an inbound FIFO manager 613 and FC link control frames to a link control frame FIFO ("LCF") 606. Both the outbound and inbound FIFO managers 619 and 613 buffer frames, allowing for pipelining of outbound frames and cyclic redundancy check ("CRC") validation of inbound frames, respectively. The essence of both the outbound and inbound FIFO managers 619 and 613 is a FIFO queue, and outbound and inbound FIFO managers 619 and 613 are also referred to as the "outbound FIFO queue" and "inbound FIFO queue," respectively.

A link control frame generator 615 modifies FC frame headers of received FC data frames to create FC link-control frames, principally ACK frames, and places the generated FC link-control frames into an FC link-control frame list 616 for transmission to the FC. The outbound data path multiplexer ("ODM") 618 retrieves outbound FC link-control frames from the FC link-control frame list 616 and outbound FC data frames from the outbound FIFO manager 619 to send to the frame manager 611. The link-control frame generator uses FC headers of received FC data frames to create ACK frames that are sent in response to successfully delivered and received FC data frames. The completion message manager 625 manages the IMQ and provides queue entries to the inbound data manager ("IDM") 624 into which the IDM places completion messages. The single frame manager 626 manages the SFQ in host memory and provides entries to the FC services component 627 into which the FC component services place inbound frames. The exchange request manager 631 fetches new entries from the ERQ 605 and sends them to the SCSI exchange manger-outbound ("SEM-OUT") 632 for processing. The inbound data manager 624 informs the inbound frame processors, i.e. the SCSI exchange manager-inbound ("SEM-IN") 628 and FC services component 627 of new frames and routes the frames to their proper destination in the host. Also, the inbound data manager sends completion messages to the host via the IMQ 602. The FC services component 627 manages the FC frames that the SEM-IN 628 does not manage. The FC services component places these FC frames in the SFQ 603. The SEM-IN 628 manages the phases of a SCSI exchange that receive an FC sequence. The SEM-IN reads the SEST entries via the SEST link fetch manager 629 and either sends the inbound data to the proper host buffers or sends the request to the SEM-OUT 632 to send the next phases of an FC sequence. The SEST link fetch manager 629 is responsible for reading and writing SEST entries, depending upon requests from the SEM-IN 628 and SEM-OUT 632 components. The SEM-OUT 632 manages the phases of a SCSI exchange that require an FC sequence to be sent. The SEM-OUT 632 reads the SEST entries via the SEST link fetch manager 629, builds the request to send those sequences, coded in an ODB, and sends the ODBs to the outbound sequence manager 630.

The outbound sequence manager ("OSM") 630 processes ODBs received from the SEM-OUT 632. An ODB contains references to data stored in host memory, which the OSM accesses via the DAM 601 in order to construct the FC frames making up the FC sequence described by the ODB. The OSM segments the sequence into FC frames of up to 2 KByte in size and queues them into the outbound FIFO manager 614. In addition, the OSM receives FC link control frames from the link control frame FIFO 606, principally FC ACK frames through which EE credits are returned to the FCIC from remote FC nodes. Additional types of FC link control frames may indicate various error conditions or busy signals returned from remote nodes. When the OSM detects an error during transmission of an FC sequence, or when an FC sequence has been successfully transmitted, the OSM returns a completion signal to the inbound data manager 624 which, in turn, arranges for a completion message to be queued to the IMQ 602. The OSM may additionally receive frame timeout signals and link down signals from the ODM 618 and frame manager 611, respectively. The OSM may concurrently handle transmission of multiple FC sequences. Each active FC sequence is described by a context data structure, referred to below as a "context."

The host processor of the FC node controls and exchanges information with the FCIC by writing and reading various control registers 620 and by placing data into, and removing data from, the memory-based data structures 602–605. The IMQ 602 contains completion messages that notify the host processor of inbound and outbound transaction information and status information. The SFQ 603 contains inbound unknown or unassisted FC frames that the FCIC 607 receives from the frame manager 611 and places into the SFQ. The SCSI exchange state table SEST 604 is shared between the FCIC and the host and contains SEST entries that each corresponds to a current SCSI exchange (I/O operation). The exchange request queue ERQ 605 contains I/O request blocks ("IRBs") that represent I/O requests initiated by the host or by remote FC nodes.

Figure 7:
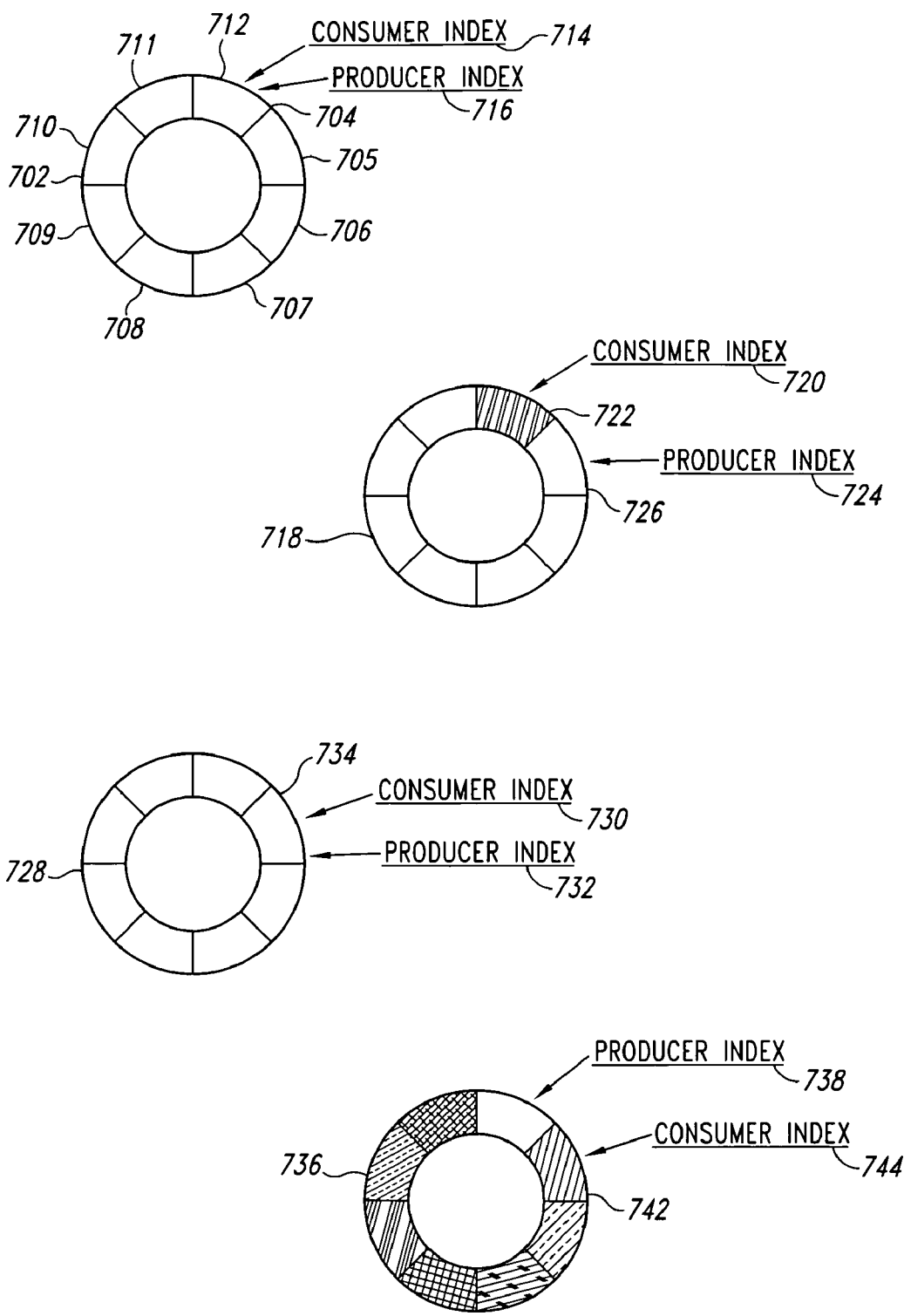
FIG. 7 shows the basic underlying circular queue data structure used in the host processor/interface controller interface within an FC node.

The IMQ 602, SFQ 603, and ERQ 605 are implemented as circular queues. FIG. 7 shows the basic underlying circular queue data structure used in the FCIC controller interface. A circular queue is a first-in-first-out ("FIFO") queue that is logically represented in a circular fashion, such as the depiction of the circular queue 702 at the top of FIG. 7. Each radial section 704–712, or slot, of a circular queue contains space for a queue entry, essentially a record-like data structure containing one or more data fields. The circular queue 702 in FIG. 7 is shown with 8 queue entry slots 704–712 although, in practice, a circular queue may have many tens or hundreds of queue entries. In addition to the queue entry slots, a circular queue is associated with two pointers: (1) a consumer index that points to the next queue entry that can be removed from the circular queue by a consumer of queue entries; and (2) a producer index that points to the next open slot within the circular queue in which a producer can place a queue entry to be added to the queue. In an empty circular queue 1402, in which all the queue entry slots are available for placement of data by a producer and in which none of the queue entry slots contain valid queue entries to be consumed by a consumer, both the consumer index 714 and the producer index 716 point to the same empty queue entry slot 712.

When a producer adds a queue entry to an empty circular queue 702, a circular queue with one valid queue entry 718 is produced. The consumer index 720 is not changed, as a result of which the consumer index points to the single valid queue entry 722 in the circular queue 718. After the producer inserts the queue entry 722, the producer increments the producer index 724 to point to the next available slot 726 within the circular queue 718 into which the producer can add a second queue entry. If the consumer now removes the single queue entry 722, an empty circular queue 728 is produced. When the consumer has removed the available queue entry 722, the consumer increments the consumer index 730. As in the previous depiction of an empty circular queue 702, the empty circular queue 728 produced by removing the single queue entry 722 has both the consumer index 730 and the producer index 732 pointing to the same empty, available queue entry slot 734. If a producer successively adds queue entries at a faster rate than a consumer can consume them, a full circular queue 736 will eventually be produced. In a full circular queue 736, the producer index 738 points to a single empty queue entry slot within the circular queue that immediately precedes the first available valid queue entry 742 pointed to by the consumer index 744.

Figure 8A:
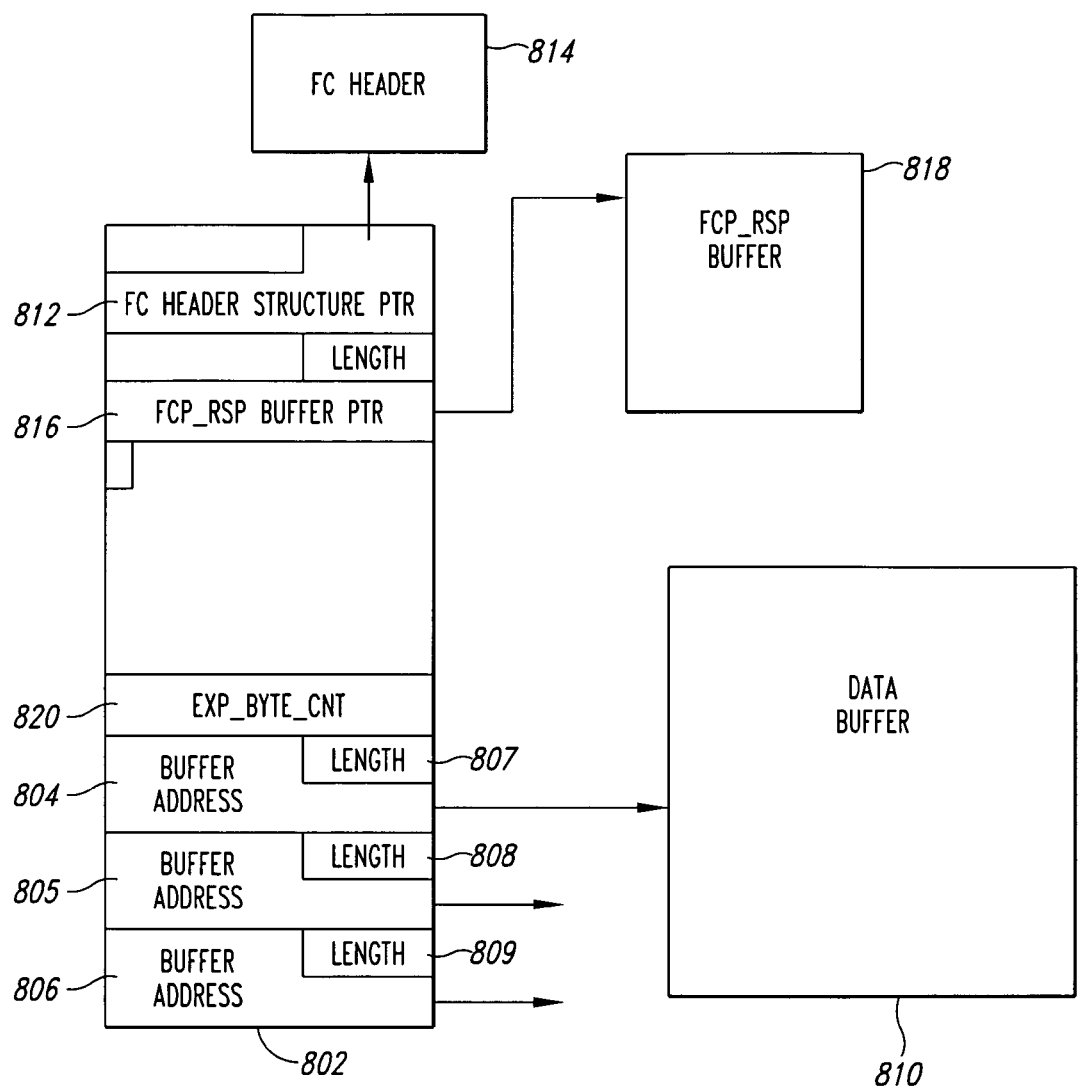
FIGS. 8A–B are block diagrams illustrating a SEST entry along with associated data structures.
Figure 8B:
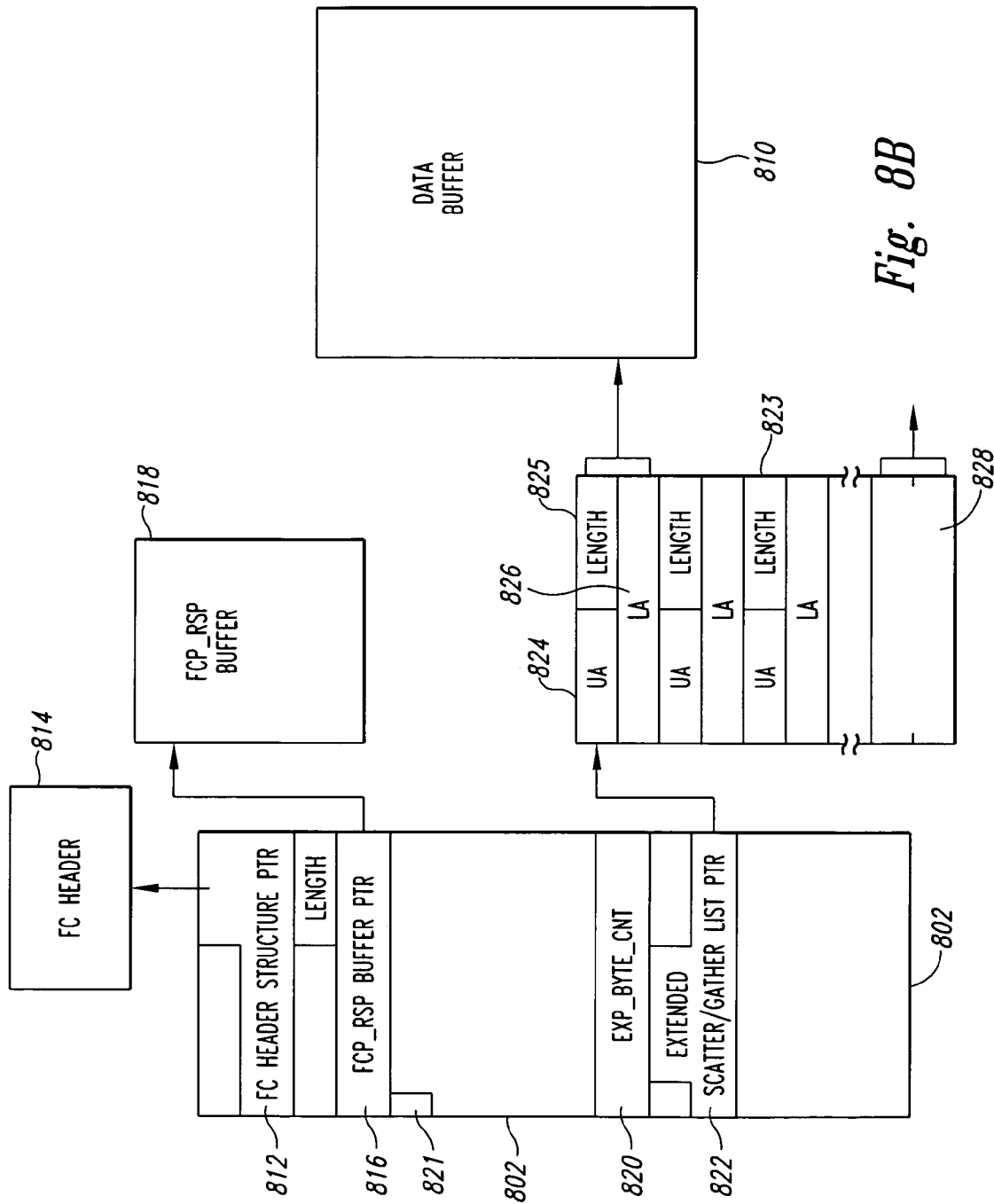

FIGS. 8A–B are block diagrams illustrating a SEST entry along with associated data structures. The SEST entry illustrated in FIG. 8A is used when the data to be transmitted or received during an I/O operation can fit within a small number of buffers, and the SEST entry illustrated in FIG. 8B is used for I/O operations in which the data to be transmitted or received is sufficiently voluminous to require more than three memory buffers. Common aspects of the two types of SEST entries and associated data structures are described and labeled with reference to FIG. 8A. These same labels are employed in FIG. 8B, and those aspects of 8B already described with reference to 8A will not be further described.

A SEST entry 802 includes references to various memory buffers for storage of received data, in the case of a read I/O operation, and for storing data to be transmitted, in the case of a write I/O operation. A SEST entry of the type illustrated in FIG. 8A is employed for relatively short data transfer operations, or when large memory buffers may be allocated for storing data in host memory. The SEST entry includes three data buffer pointers 804–806 along with associated length fields 807–809 that characterize the length of each data buffer referenced by the data buffer pointers 804–806. In FIG. 8A, a data buffer 810 is shown referenced by the first data buffer pointer 804, the length of the data buffer described by the length field 807. Thus, three data buffers can be referenced from the type of SEST displayed in FIG. 8A. In the case of a host-initiated write I/O operation, the SEST additionally contains a pointer 812 to a FC header buffer 814 that is prepared by the host processor to contain an FCP_DATA frame header that can be copied into FCP_DATA frames by the FCIC during transmission of data to a target node. The SEST entry additionally contains an FCP_RSP frame buffer pointer 816 that points to an FCP_RSP frame buffer 818 in which the FCIC places the final FCP_RSP frame following receipt by the FCIC of a final FCP_RSP frame from the target node. In the case of a host-initiated read I/O operation, FCP_DATA frames are not transmitted by the FCIC, but are instead received by the FCIC, and therefore the FCP_RSP frame buffer pointer 816 and FCP_RSP frame buffer 818 are not needed. The SEST entry includes additional flags and fields for maintaining state during execution of an I/O operation by the FCIC, for describing various aspects of the I/O operation, and for identifying a particular I/O operation. One of these additional fields is the EXP_BYTE_CNT field 820 that, in the case of both write and read I/O operations, contains an integer specifying the number of bytes of data expected to be transmitted during the I/O operation. Other fields, not shown in FIGS. 8A–B, include current offsets into data buffers specifying the next location from which data is obtained by the FCIC, in the case of a write operation, or at which received data can be placed, in the case of a read I/O operation, the RX_ID for the I/O operation, a valid bit flag indicating whether or not the SEST entry is valid, and additional fields.

When more than three data buffers are required to hold the data transferred during an I/O operation, a SEST entry of the type illustrated in FIG. 8B is employed. The SEST entry has the same length, in bytes, as the SEST entry in FIG. 8A, and contains the same fields as the SEST entry in FIG. 8A up through the EXP_BYTE_CNT field 820. However, instead of the three buffer pointers 804–806 contained in the final 24 bytes of the SEST entry shown in FIG. 8A, the SEST entry shown in FIG. 8B contains a single pointer 822 to an extended scatter/gather list. A SEST entry of the type shown in FIG. 8A is differentiated from a SEST entry shown in FIG. 8A by the value of a LOC bit 821. The extended scatter/gather list is comprised of an arbitrary number of scatter/gather list entries, such as the scatter/gather list entry 823. These entries include a number of data buffer pointers, such as the data buffer pointer comprising fields 824 and 826, each data buffer pointer associated with a length field, such as the length field 825 associated with the data buffer pointer comprising fields 824 and 826. The final two words of a scatter/gather list entry 828 either point to a next scatter/gather list entry, or contain the value 0, indicating the end of the scatter/gather list.

Figure 9:
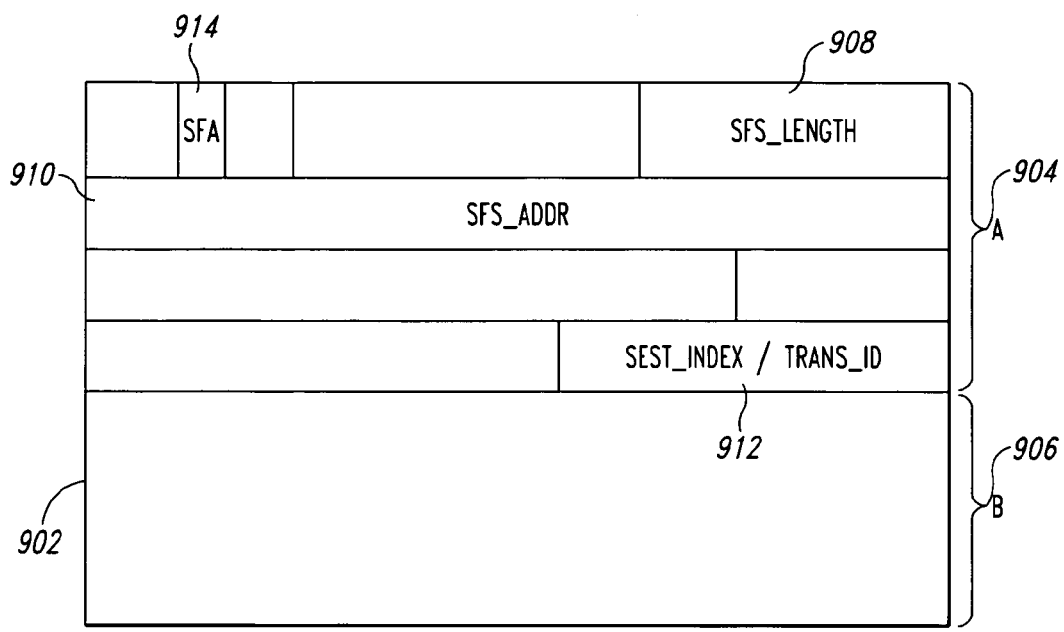
FIG. 9 illustrates an I/O request block.

FIG. 9 illustrates an I/O request block. An I/O request block ("IRB") is contained in each entry of the ERQ (505 in FIG. 5). An IRB 902 contains two separate I/O request descriptors, an A descriptor 904 and a B descriptor 906. These two descriptors are identical, and only the I/O request A descriptor 904 will be described below. An I/O request descriptor includes an SFS_length field 908 and a SFS_Addr field 910 that describe the length and address, respectively, of an FC header buffer that contains an FCP_CMND header, prepared by the host processor, for use as the initial FCP_CMND frame sent by the FCIC at the beginning of the I/O operation described by the I/O request descriptor. An I/O request descriptor additionally includes a SEST_index field 912 that contains the index of the SEST entry associated with the I/O operation described by the I/O request descriptor (902 in FIGS. 9A–B). This field contains a SEST index if an SFA bit flag 914 is clear. If the SFA bit flag 914 is set, then the operation described by the I/O request descriptor is a single frame sequence operation, and the SFS_length and SFS_Addr field 908 and 910 describe the single frame to be transmitted for the operation.

Figure 10:
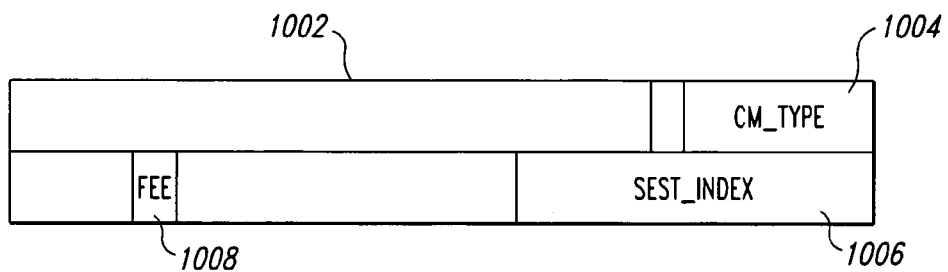
FIG. 10 illustrates an inbound FCP exchange completion message.

FIG. 10 illustrates an inbound FCP exchange completion message. This inbound FCP completion message is one type of completion message that may be queued to the IMQ (602 in FIG. 6) by the FCIC on completion of an I/O operation. The inbound FCP exchange completion message includes a completion message type field 1004, containing the value 0x0c, in the case of an inbound FCP exchange completion message, and a SEST_index field 1006 that contains the index of the SEST entry describing the I/O operation corresponding to the inbound FCP exchange completion message. The inbound FCP exchange completion message contains additional fields and bit flags, and reserved space for additional fields and bit flags, including space for an FEE bit flag 1008, to be described below.

Present Invention

Previous and current implementations of the OSM feature multiple FSMs designed in accordance with a set of fairly complex state transition diagrams. Using the method of the present invention, an implementation based on linked-list data structures is provided below. OSM functionality is partitioned into seven sub-controllers, or managers. Each manager receives input signals from external FCIC components, other managers, or a combination of external FCIC components and managers, and each manager is associated with a linked-list data structure in which contexts corresponding to FC sequences are maintained during the time that the manager conducts various operations on behalf of the contexts. Each manager may issue one of a group of commands that results in transfer of a context from the manager's associated linked-list data structure to the linked-list data structure associated with another manager. During a single clock cycle, each manager may issue a single command. Thus, multiple contexts may be transferred during each clock cycle. The centralized list manager ("CLM") is responsible for executing each of the context transfer commands. In cases where multiple contexts are concurrently transferred to a specific linked-list data structure, the CLM serializes the transfer operations by executing them in a predetermined sequence. Thus, in one embodiment of the present invention, the OSM functionality has been partitioned into six managers, the interactions between the managers have been defined, commands have been described for each manager, and the CLM has been designed to be able to execute, in a single clock cycle, a single context-transfer command issued by each manager. Thus, the CLM must anticipate all possible combinations of commands that are allowed to be issued concurrently, and that need to be executed in a single clock cycle, and provide control functionality for concurrently executing each of the allowable combinations of commands during a single clock cycle.

Figure 11:
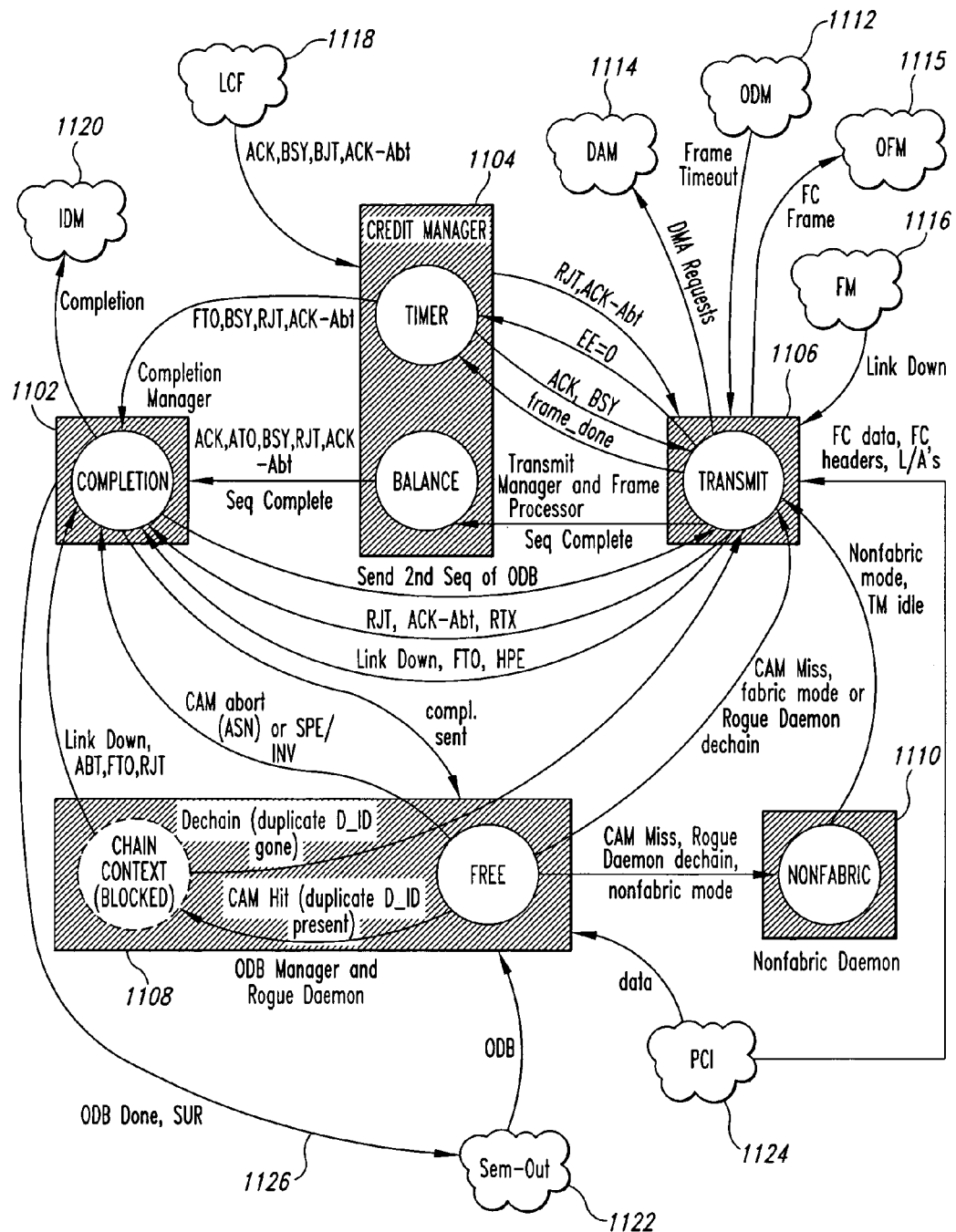
FIG. 11 shows a context transition diagram for the OSM that represents one embodiment of the present invention.

FIG. 11 shows a context transition diagram for the OSM that represents one embodiment of the present invention. In FIG. 11, six of the seven OSM managers are shown as shaded rectangles 1102, 1104, 1106, 1108, and 1110. Clouded areas, such as clouded area 1112, represent external FCIC subcomponents with which the OSM interacts. These external FCIC subcomponents include: (1) the ODM 1112 (618 in FIG. 6); (2) the DAM 1114 (601 in FIG. 6); (3) the outbound FIFO manager ("OFM") (619 in FIG. 6); (4) the frame manager 1116 (611 in FIG. 6); (5) the LCF 1118 (615 in FIG. 6); (6) the IDM 1120 (624 in FIG. 6); (7) Sem-Out 1122 (632 in FIG. 6); and (8) the PCI bus 1124 (609 in FIG. 6). Interactions between the managers and between the managers and external subcomponents are indicated by curved arrows, such as curved arrow 1126.

The OSM also includes a content addressable memory ("CAM") in which the destination IDs ("D_IDs") of remote nodes for which the OSM is currently handling active contexts are stored. When the OSM handles more than one context for a particular remote node, as detected by the presence of the D_ID for the remote node in the CAM when a new context is created by the OSM in response to receiving an ODB from the Sem-Out, then the OSM chains the new context to the already existing context associated with the D_ID so that both contexts are linked together and handled together by the OSM. Thus, if an error occurs during transmission of FC frames comprising the first FC sequence corresponding to a first context related to a particular remote node, then any additional active contexts related to that remote node may be aborted along with the first context, and completion messages indicating the occurrence of an error may be returned to the host.

A new ODB is received by the ODB manager 1108 from a Sem-Out 1122. The ODB manager places information from the ODB into an unoccupied context currently maintained on a free list. The ODB manager then moves the context from the free list to either a transmit list associated with the transmit manager 1106, a completion list associated with the completion manager 1102, a non-fabric list associated with the non-fabric daemon 1110, or the ODB manager may chain the context to another context. A transition to the transmit list associated with the transmit manager 1106 occurs when, in fabric mode, the CAM lookup results in a CAM miss indicating that there are no other sequences with the same D_ID currently active in the OSM. In non-fabric mode, a CAM miss causes the ODB manager to transfer the context to the non-fabric list associated with the non-fabric daemon 1110. If the ODB is determined by the ODB manager to be invalid or if the CAM lookup results in an abort, indicating that the sequence should be aborted due to an earlier error to the same D_ID, the ODB manager transfers the context to the completion list associated with the completion manager 1102. If the D_ID associated with the new context is found in the CAM as a result of the CAM lookup operation, then the ODB manager chains the new context to the most recently created context having the same D_ID.

The rectangle 1108 in FIG. 11 containing the ODB manager also contains a rogue daemon manager. The rogue daemon manager monitors the free list to detect any contexts chained to contexts residing on the free list and dechains the contexts. The rogue daemon is necessary because situations occur when a command to chain a first context to a second context and a command to transfer the second context to the free list are concurrently issued.

Chaining of a second context to a first context ensures that the FC sequence corresponding to the first context will be completed prior to transmission of the FC sequence corresponding to the second context. Thus, when the first context successfully completes, then the next context chained to it will be transferred to the transmit list associated with the transmit manager 1106 if the OSM is operating in fabric mode. Note that, in non-fabric mode, only a single context may occupy the transmit list associated with the transmit manager 1106 so that transmission of each sequence is completed, either successfully or with an error condition, prior to transmission of a subsequent sequence. When the first context of a chain of contexts experiences an error, the ODB manager transfers that first context and all other contexts chained to it to the completion list associated with the completion manager 1102.

The transmit manager issues DMA requests to the DAM 1114 to fetch the FCHS and data payloads for the next frame associated with the context at the head of the transmit list, receives the FC headers and FC data payloads from the PCI bus 1124, and forwards the next FC frame for the sequence to the outbound FIFO manager 1115. The transmit manager 1106 processes contexts on the transmit list in a round-robin fashion, forwarding a single FC frame for a context during each round. If there is no additional EE credit for a context, blocking transmission of further FC frames, the transmit manager may transfer the context to the timer list associated with the credit manager 1104. The transmit manager may also transfer a context to the credit manger's timer list in the case that all frames of the sequence corresponding to the context have been sent and the OSM is only waiting for the credit to balance before completing the sequence. The credit manager 1104 manages the credit for each context, and provides a virtual credit signal to the transmit manager 1106. In the case that the transmit manager receives a frame timeout signal from the ODM 1112 or a link down signal from the frame manager 1116, the transmit manager may transfer a context to the completion list associated with the completion manager 1102. In non-fabric mode, additional contexts are stored on the non-fabric list associated with the non-fabric daemon 1110, so that only one context at a time is maintained in the transmit list associated with the transmit manager 1106.

The credit manager 1104 manages credit transferred from remote nodes to the OSM via FC ACK frames provided to the OSM by the LCF 1118. When a valid ACK arrives for a context maintained by the credit manager on the timer list awaiting additional credits, the credit manager may transfer the context back to the transmit list so that additional FC frames of the sequence corresponding to the context can be transmitted. The credit manager may also transfer contexts from the timer list to the completion list associated with the completion manager 1102 in the case that certain error conditions occur, such as an ACK timeout. The credit manager may also move contexts maintained on the timer list that are awaiting credit to balance to the completion list associated with the completion manager 1102 once a final ACK has been received. All contexts pass through the completion manager 1102. The completion manager generates completion messages for contexts on the completion list, and returns contexts to the ODB manager for insertion into the free list once a completion message has been generated. The completion manager may also handshake with the Sem-Out, generate the completion signal to the IDM, and invalidate a context CAM entry and set an abort bit in the CAM entry if an error occurs for the contexts. When the error has been propagated to the host, the completion manager clears the abort bits in the CAM.

Figure 12A:
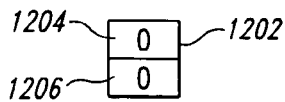
FIGS. 12A–F illustrate the linked-list data structure that is used in each manager of the outbound sequence manager for storing contexts.
Figure 12B:
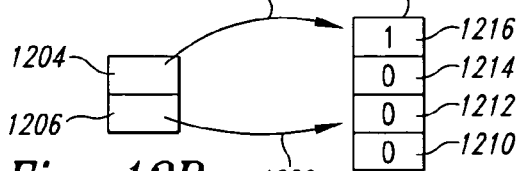

FIGS. 12A–F illustrate the linked-list data structure that is used in each manager of the outbound sequence manager for storing contexts. FIG. 12A shows an empty linked list. The empty linked list 1202 comprises a head pointer 1204 and a tail pointer 1206. In an empty linked list, both the head and tail pointers contain NULL values. FIG. 12B shows a linked list containing a single context. Both the head 1204 and tail 1206 pointers point to the single context 1208 contained in the linked list. The context 1208 includes a chain pointer field 1210, a reverse link field, or Rlink field 1212, and a link field 1214. A context may be associated with additional descriptive fields that contain data copied from an ODB, either stored logically within the context, or stored logically separate from the context and referenced using a context ID or index identifying the context. The additional information is represented in FIGS. 12B–F as a single fourth field 1216. A numerical identifier identifying the context is included in this field for illustrative purposes. Thus, in FIG. 12B, context 1 is contained in the linked list.

Note that the contents of the head and tail pointers 1204 and 1206 are shown, for illustrative purposes, as arrows, such as arrows 1218 and 1220, directed to the context referred to by the contents of the head and tail pointers. In a common hardware implementation, contexts are stored in a static logical array of contexts, and references, or pointer, are small integer indices for contexts stored within the logical array of contexts.

Figure 12C:
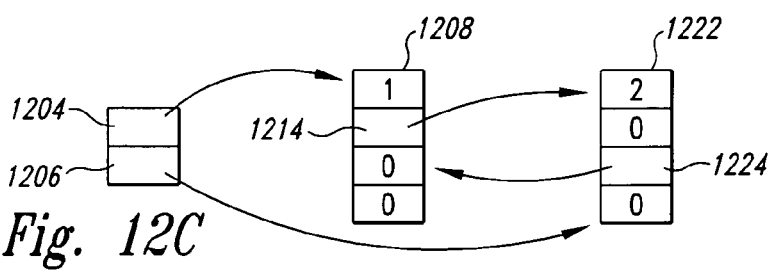
Figure 12D:
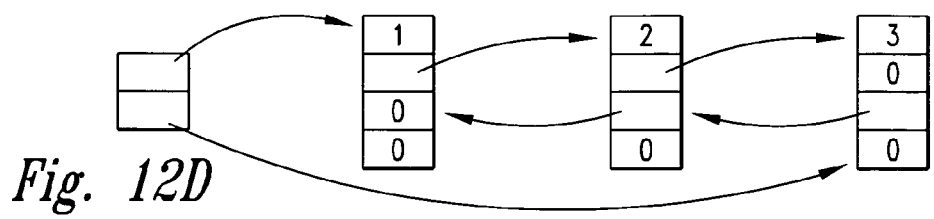

FIG. 12C shows the linked list of FIGS. 12A–B following addition of a second context to the tail of the linked list. The head pointer 1204 points to the first context 1208 and the link field 1214 of the first context points to the second, newly-added context 1222. The reverse link field 1224 of the second context references the first context 1208. The tail pointer 1206 of the linked list now references the second context 1222, occupying the tail position of the linked list. FIG. 12D shows the linked-list of FIGS. 12A–C following addition of a third context to the tail of the linked list. The linked list of FIGS. 12A–E is linked in both forward and reverse directions through the link and reverse link fields of the contexts, respectively. This makes additional removal of contexts to and from interior positions within the linked list a simple operation.

Figure 12E:
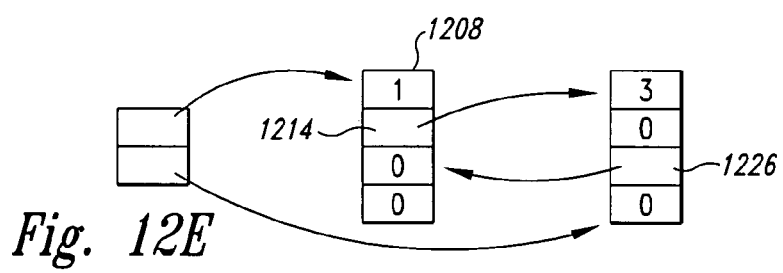
Figure 12F:
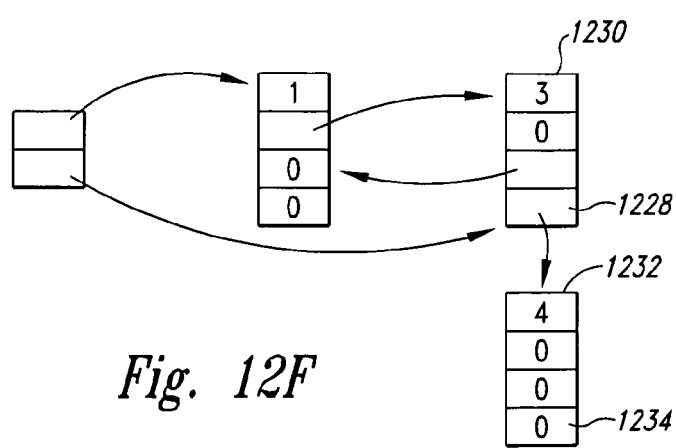

FIG. 12E shows the linked list of FIGS. 12A–D following deletion of the second context from the linked list. To remove the second context, the link field of the first context 1214 is changed to refer to the third context and the reverse link field 1226 of the third context is changed to refer to the first context 1208. Thus, deletion of contexts within the linked list is straightforward. FIG. 12F shows the linked list of FIGS. 12A–E following chaining of a fourth context to the third context. Chaining is accomplished by changing the value of the chain field 1228 of the third context 1230 to reference the fourth context 1232. An additional context may be chained to the fourth context 1232 via the chain field 1234 of the fourth context. In this fashion, contexts are chained together in a singly linked list. A singly linked list is appropriate for chains of contexts since individual contexts are not deleted from, or added to, internal positions within the singly linked list of contexts representing a chain of contexts.

Figure 13:
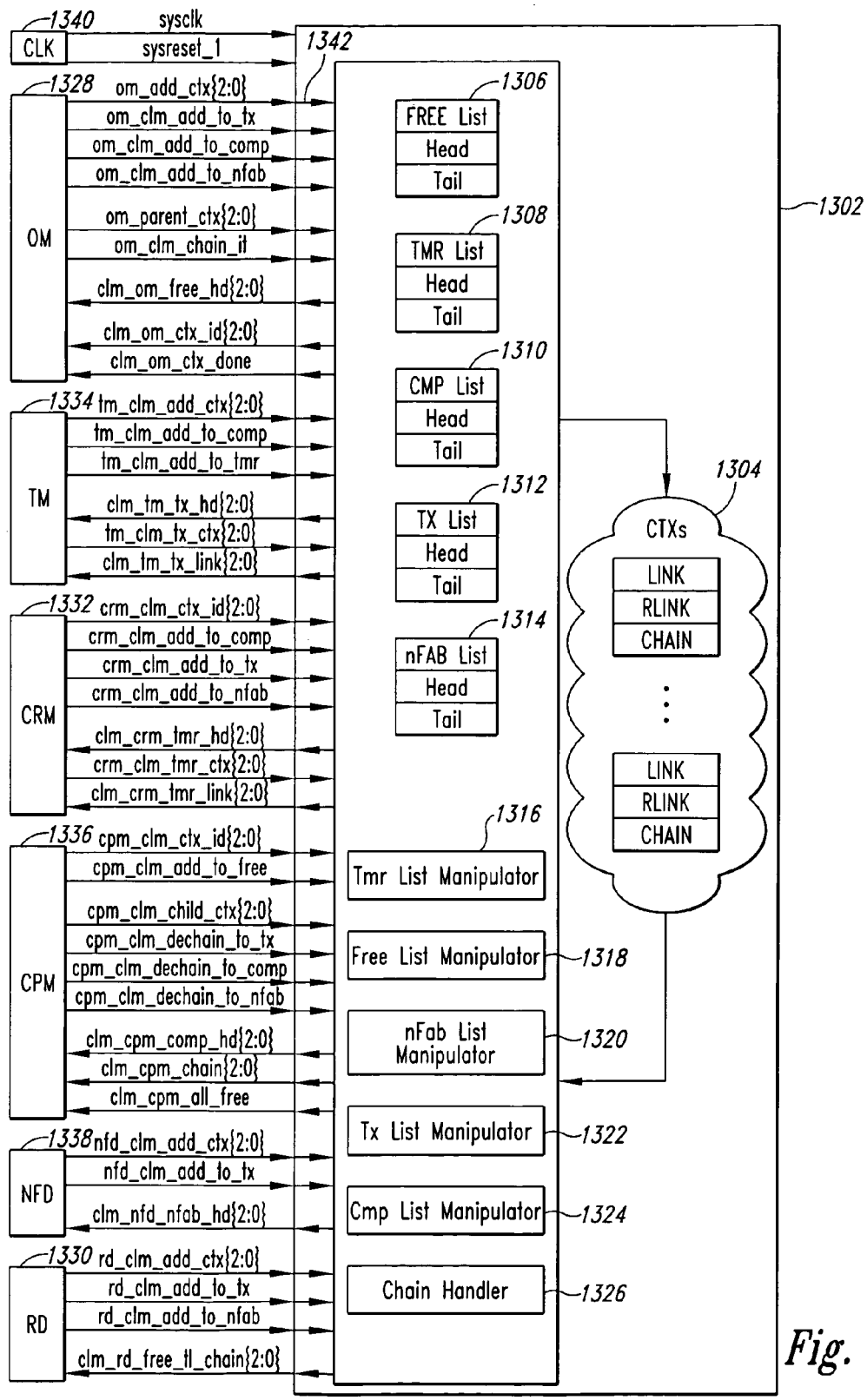
FIG. 13 is a block diagram of the centralized list manager.

FIG. 13 is a block diagram of the centralized list manager. The centralized list manager 1302 includes a number of contexts 1304 that can be considered to be contained in an array of contexts with indices 1 through n, where n is the maximum number of contexts that can be concurrently managed by the OSM, and head and tail pointers for the free list 1306, timer list 1308, completion lists 1310, transmit list 1312, and non-fabric list 1314. The CLM 1302 additionally includes six list manipulation logic circuits: (1) a timer list manipulator 1316; (2) a free list manipulator 1318; (3) a non-fabric list manipulator 1320; (4) a transmit list manipulator 1322; (5) a completion list manipulator 1324; and (6) a chain handler 1326 that handles all chaining and de-chaining operations. Thus, the CLM contains the contexts manipulated by the various managers of the OSM and contains logic circuits, or manipulators, that each implements the context transfer commands issued by an OSM manager.

Interfaces between the CLM and other OSM managers are represented in FIG. 13 by a column of rectangles, such as rectangle 1328. The interfaces between the CLM and the ODB manager and rogue daemon components of the ODB manager (1108 in FIG. 11) are shown as rectangles 1328 and 1330, respectively. Additional interfaces include the credit manager (1104 in FIG. 11) interface 1332, the transmit manager (1106 in FIG. 11) interface 1334, the completion manger (1102 in FIG. 11) interface 1336 and the non-fabric daemon (1110 in FIG. 11) interface 1338. In addition, the CLM interfaces to a system clock 1340. The input and output signals received and generated by the CLM for each interface are shown in FIG. 13 by labeled arrows, such as labeled arrow 1342 indicating the specification of a context by the ODB manager to the CLM.

A general list of commands issued by the various OM managers to the CLM are provided below in Table 1, in which the abbreviation "CTX" stands for "context:"

TABLE 1

| Manager | Command Issued |
|---|---|
| ODB Manager | 1. Add specified CTX to Transmit List. |
| | 2. Add specified CTX to Completion List. |
| | 3. Add specified CTX to non-Fabric List. |
| | 4. Chain a CTX, where both the parent and child CTXs are specified |
| Transmit Manager | 1. Add specified CTX to Completion List. |
| | 2. Add specified CTX to Timer List. |
| Credit Manger | 1. Add specified CTX to Completion List. |
| | 2. Add specified CTX to Transmit List. |
| | 3. Add specified CTX to nFab List. |
| Completion Manger | 1. Add specified CTX to Free List. |
| | 2. Add specified CTX to Free list, and de-chain children to Tx List. |
| | 3. Add specified CTX to Free List, and de-chain children to Cmp List. |
| | 4. Add specified CTX to Free List, and de-chain children to nFab List. |
| Non-Fabric Daemon | 1. Add specified CTX to Transmit List. |
| Rogue Daemon | 1. Add specified CTX to Transmit List. |
| | 2. Add specified CTX to nFab List. |

A detailed description of the all the signals that together comprise the various interfaces shown in FIG. 13 are provided below in Tables 2–9:

TABLE 2

Global Interface

| Signal Name | Signal Description |
|---|---|
| sysreset_1 | system reset, active low. |
| sysclk | system clock. |

TABLE 3

OM Interface

| Signal Name | Signal Description |
|---|---|
| om_add_ctx [2:0] | Identifies the context which is to be moved to a different list. |
| om_clm_add_to_tx | Instructs CLM to move the context referenced by om_clm_add_ctx to the Transmit List. One cycle pulse. |
| om_clm_add_to_comp | Instructs CLM to move the context referenced by om_clm_add_ctx to the Completion List. One cycle pulse. |
| om_clm_add_to_nfab | Instructs CLM to move the context referenced by om_clm_add_ctx to the non-Fabric List. One cycle pulse |
| om_parent_ctx [2:0] | Identified the context to which the context referenced by om_clm_add_ctx is currently chained. |
| om_clm_chain_it | Instructs CLM to chain the respective contexts (om_clm_add_ctx chained to om_parent_ctx). One cycle pulse. |
| clm_om_free_hd [2:0] | Identified the context at the head of the Free List. If zero, the Free List is empty. |
| clm_om_ctx_id [2:0] | Identifies the context which has is "done." implying the associated context is now on the Free List. |
| clm_om_ctx_done | Triggers OM to observe clm_om_ctx_id so as to track the number of free resources for the respective protocol (which is mapped via CTX_ID). One cycle pulse. |

TABLE 4

TM Interface

| Signal Name | Signal Description |
|---|---|
| tm_clm_add_ctx [2:0] | Identifies the context which is to be moved to a different list |
| tm_clm_add_to_comp | Instructs CLM to move the context referenced by tm_clm_add_ctx to the Completion List. One cycle pulse. |
| tm_clm_add_to_tmr | Instructs CLM to move the context referenced by tm_clm_add_ctx to the Timer List. One cycle pulse. |
| clm_tm_tx_hd [2:0] | Identifies the context at the head of the Transmit List. If zero, the Transmit List is empty. |
| tm_clm_tx_ctx [2:0] | Identified the context for which TM needs to know the value of the Link field. |
| clm_tm_tx_link [2:0] | Identifies the value of Link for the context referenced by clm_tm_tx_ctx |

TABLE 5

CRM Interface

| Signal Name | Signal Description |
|---|---|
| crm_clm_ctx_id[2:0] | Identifies the context which is to be moved to a different list. |
| crm_clm_add_to_comp | Instructs CLM to move the context referenced by crm_clm_ctx_id to the Completion List. One cycle pulse |

TABLE 5-continued

CRM Interface

| Signal Name | Signal Description |
|---|---|
| crm_clm_add_to_tx | Instructs CLM to move the context referenced by crm_clm_ctx_id to the Transmit List. One cycle pulse. |
| crm_clm_add_to_nfab | Instructs CLM to move the context referenced by crm_clm_ctx_id to the nFab List. One cycle pulse. |
| clm_crm_tmr_hd [2:0] | Identifies the context at the head of the Timer List. If zero, the Timer List is empty. |
| crm_clm_tmr_ctx [2:0] | Identified the context for which CLM needs to know the value of the Link field. |
| clm_crm_tmr_link [2:0] | Identifies the value of Link for the context referenced by crm_clm_tmr_ctx. |

TABLE 6

CPM Interface

| Signal Name | Signal Description |
|---|---|
| cpm_clm_ctx_id[2:0] | Identifies the context which is to be moved to a different list. |
| cpm_clm_add_to_free | Instructs CLM to move the context referenced by cpm_clm_ctx_id to the Free List. One cycle pulse. |
| cpm_clm_child_ctx [2:0] | Identified the child context which is chained to the context referenced by cpm_clm_ctx_id. |
| cpm_clm_dechain_to_tx | Instructs CLM to move the context referenced by cpm_clm_ctx_id (parent) to the Free List, and append the chained (child) context referenced by cpm_clm_child_ctx to the tail of the Transmit List. E.g., needed when on a fabric and next sequence to D_ID can begin transmitting. One cycle pulse. |
| cpm_clm_dechain_to_comp | Instructs CLM to move the context referenced by cpm_clm_ctx_id (parent) to the Free List, and insert the chained context (child_at the head of the Completion List. E.g., needed when aborting all CTXs to a specific D_ID. One cycle pulse. |
| cpm_clm_dechain_to_nfab | Instructs CLM to move the context referenced by cpm_clm_ctx_id (parent) to the Free List, and append the chained (child) context referenced by cpm_clm_child_ctx to the tail of the non-Fabric List. E.g., needed when not on a fabric; therefore, there may already be another context on the Transmit List (and only one CTX at a time is allowed on the Tx List when not on a fabric). One cycle pulse. |
| clm_cpm_cmp_hd[2:0] | Identifies the context at the head of the Completion List. If zero, the Completion List is empty. |
| clm_cpm_chain[2:0] | Identifies the context chained to the context at the head of the Completion List. If zero, the context at the head of the Completion List has no children. |
| clm_cpm_all_free | Indicates all contexts are on the Free List. Level signal |

TABLE 7

NFD Interface

| Signal Name | Signal Description |
|---|---|
| nfd_clm_add_ctx [2:0] | Identifies the context which is to be moved to a different list. |

TABLE 7-continued

NFD Interface

| Signal Name | Signal Description |
|---|---|
| nfd_clm_add_to_tx | Instructs CLM to move the context referenced by nfd_clm_add_ctx to the Transmit List. One cycle pulse. |
| clm_nfd_nfab_hd [2:0] | Identifies the context at the head of the non-Fabric List. If zero, the non-Fabric List is empty. |

TABLE 8

RD Interface

| Signal Name | Signal Description |
|---|---|
| rd_clm_add_ctx [2:0] | Identifies the context which is to be moved to a different list. |
| rd_clm_add_to_tx | Instructs CLM to move the context referenced by rd_clm_add_ctx to the Transmit List. One cycle pulse. |
| rd_clm_add_to_nfab | Instructs CLM to move the context referenced by rd_clm_add_ctx to the non-Fabric List. One cycle pulse. |
| clm_rd_free_tl_chain [2:0] | Identifies the context chained to the tail context of the Free List. If zero, there isn't a rogue context. |

Table 10, below provides a context transition diagram in which each row represents all possible destinations for an outgoing context from the list indicated in the left-most cell of the row, and each column represents all possible sources for an incoming context to the list indicated in the top-most cell of the column:

TABLE 10

Context Transition Diagram

| | Free List | Tx List | Cmp List | Tmr List | nFab List |
|---|---|---|---|---|---|
| Free List | C | N,C,$D_N$ | E,C | C | N,C,$D_N$ |
| Tx List | — | — | E | N | — |
| Cmp List | N | $D_N$ | $D_E$ | — | $D_N$ |
| Tmr List | — | N | N,E | — | N |
| nFab List | — | N | — | — | — | where
C represents a context chained to parent on this list;
$D_E$ represents an error context transition (of child) due to de-chaining;
$D_N$ represents a normal context transition (of child) due to de-chaining;
E represents an error context transition;
N represents a normal context transition.

During a single clock cycle, only a single context may be transferred from any particular list, except in the case of chaining. In the case of chaining, a parent context can move to the free list while the remaining children contexts of the chain are moved to another list. The number of cells in a column containing values, other than the top-most cell of the column, indicates the number of contexts that may be transferred to the list indicated by the list name in the top-most cell of the column during a single clock cycle.

Figure 14A:
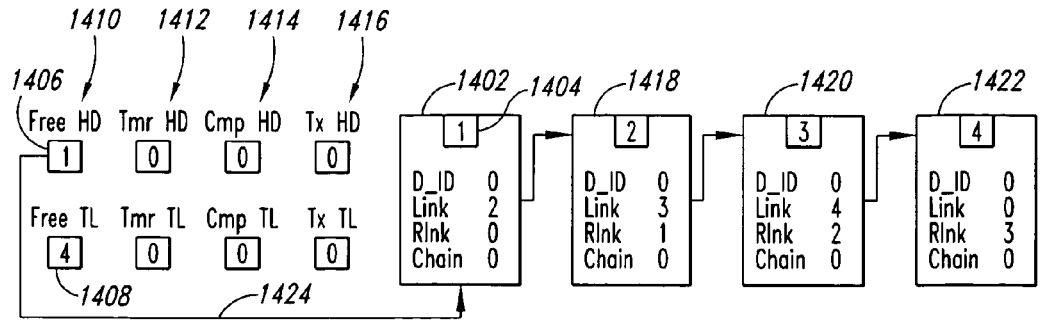
FIGS. 14A–L provide a detailed illustration of list manipulation operations performed by the centralized list manager.

FIGS. 14A–L provide a detailed illustration of list manipulation operations performed by the centralized list manager. The following illustration conventions, described with reference to FIG. 14A, are used in each of FIGS. 14A–L. A numerical label used in a first figure of FIGS. 14A–L to label a particular context or feature is used in subsequent figures of FIGS. 14A–L to label the same context or feature. Contexts are represented by large squares, such as context 1 1402. The identity, or index, of the context is indicated by a numeral contained within a small square 1404 at the top of the context. The values of the link, reverse link, and chain fields, as well as an indication of the value of the D_ID for the context, are explicitly shown within the context. The head pointer 1406 and tail pointer 1408 of the free list appear in a first column 1410, and the head and tail pointers of the timer list, completion list, and transmit list appear in subsequent columns 1412, 1414, and 1416. Forward links are shown by arrows, such as arrow 1424, but reverse links are not shown by arrows in FIGS. 14A–L.

Figure 14B:
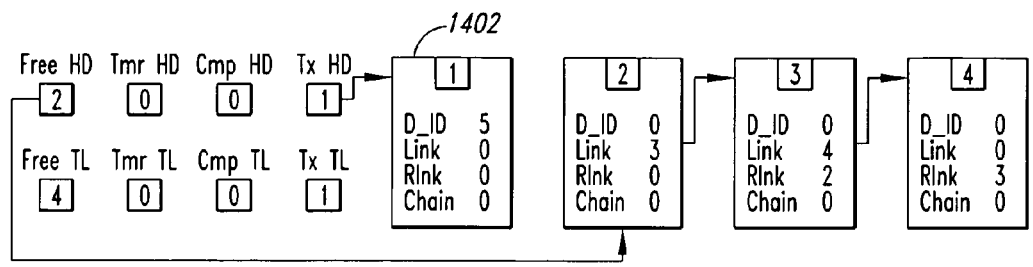
Figure 14C:
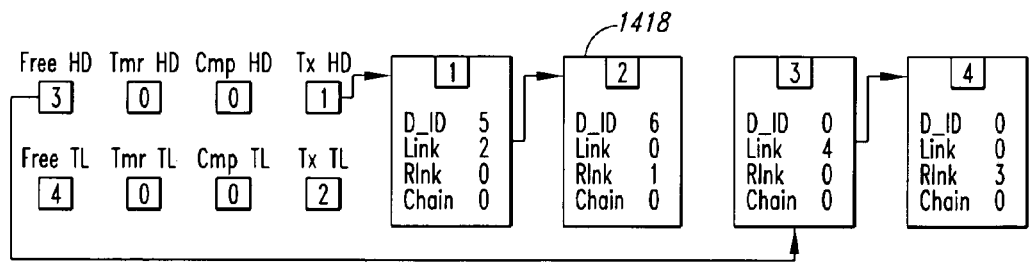
Figure 14D:
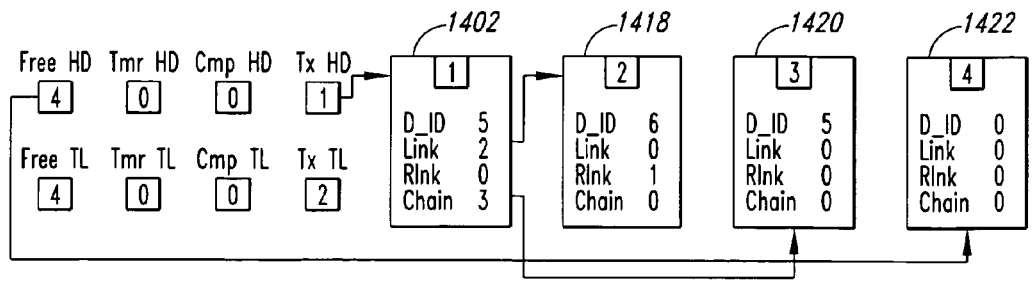
Figure 14E:
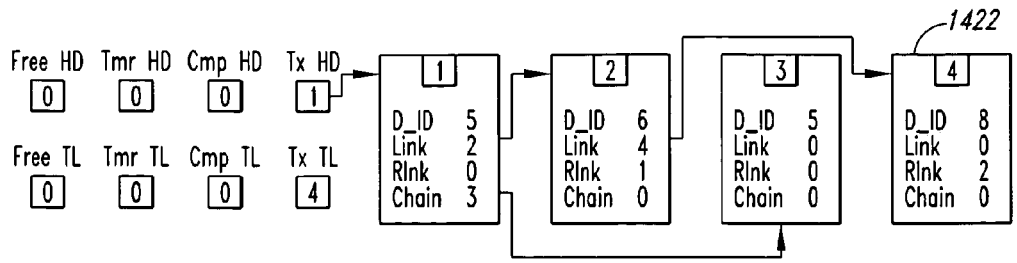
Figure 14F:
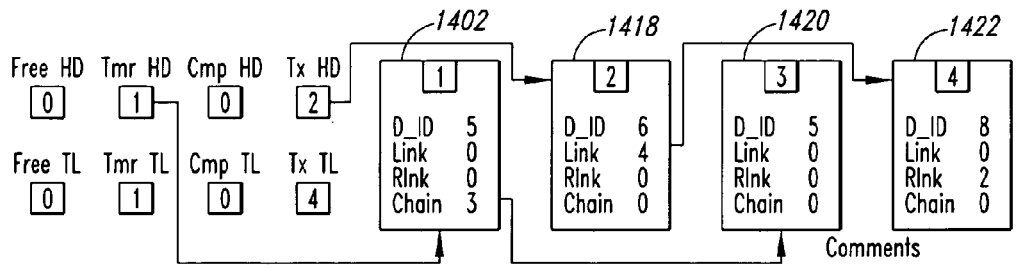
Figure 14G:
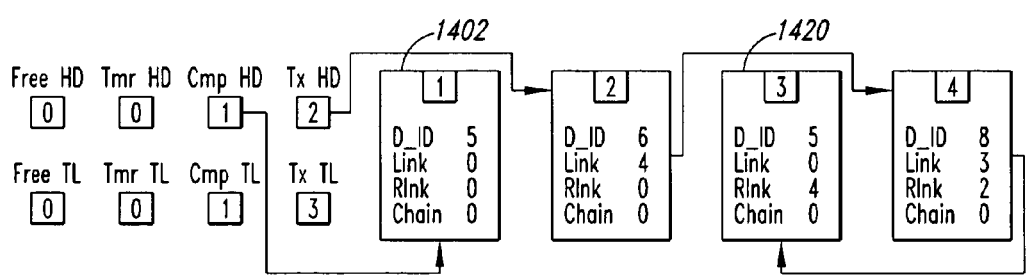
Figure 14H:
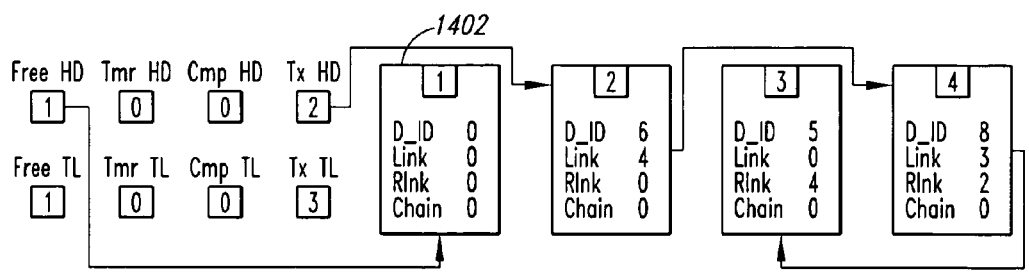
Figure 14I:
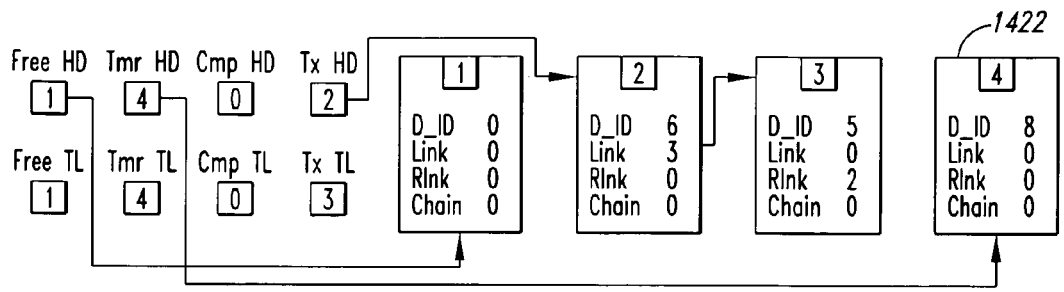
Figure 14J:
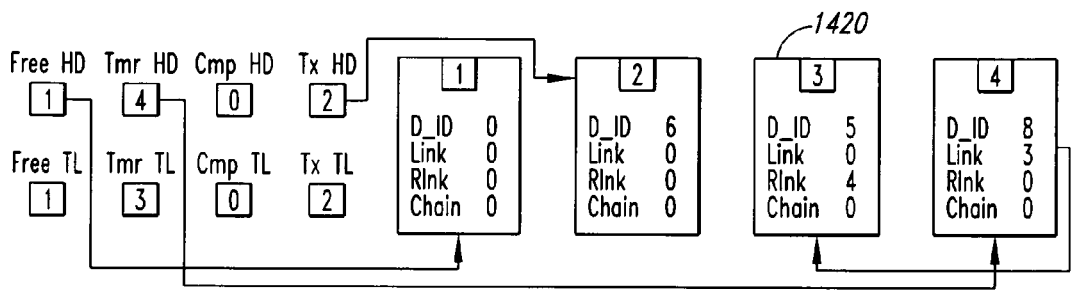
Figure 14K:
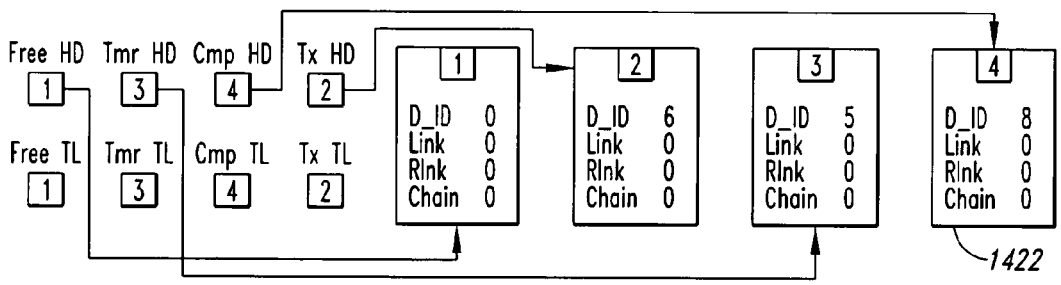
Figure 14L:
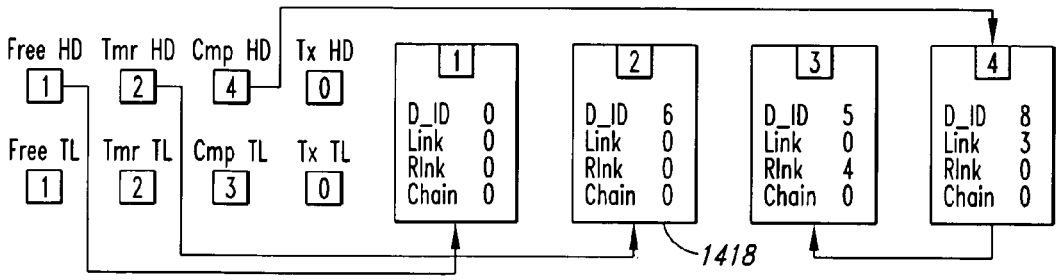

It is assumed in FIGS. 14A–L that the CLM can concurrently manage up to four different contexts. In alternative implementations, the CLM may manage only two contexts, or may manage three or greater than four contexts. FIG. 14F shows all four contexts 1402, 1418, 1420, and 1422 residing, in order, on the free list. The free list head pointer 1406 points to the first context 1402 and the free list tail pointer 1408 points to the final context 1422. In FIG. 14B, context 1 1402 has been removed from the free list and added to the transmit list. In FIG. 14C, context 2 1418 has been removed from the free list and added to the tail position of the transmit list. The list manipulation shown in FIGS. 14B and 14C may occur when the OSM receives new ODBs with D_IDs of 5 and 6 while operating in fabric mode. In FIG. 14D, a third ODB is received by the OSM, but with a D_ID value of 5, identical to the D_ID value of context 1 1402. In this case, as described in the discussion referring to FIG. 11, above, the contents of the new ODB are placed into the context at the head of the free list 1420 and that context is chained to the original context having the same D_ID value, in this case context 1402. Thus, in FIG. 14D, contexts 1 and 2 (1402 and 1418, respectively) reside on the transmit list, context 3 1420 is chained to context 1, and context 4 1422 remains on the free list. In FIG. 14E, a new ODB is received by the OSM having D_ID 8, and the contents of the ODB are placed into the final available context 1422, context 4, remaining on the free list, and that context is then added to the transmit list. In FIG. 14F, transmission of the FC frames corresponding to context 1 are completed, and context 1 has been moved to the timer list to await credit from a remote FC node. Note that context 3 1420 remains chained to context 1 1402. Contexts 2 and 4 1418 and 1422 continue to reside on the transmit list. In FIG. 14G, the OSM has received an ACK for context 1 1402, and context 1 is therefore moved to the completion list. At the same time, context 3 1420 is de-chained from context 1 1402 and added to the tail of the transmit list. In FIG. 14H, a completion signal has been transmitted to the IDM by the OSM, and context 1 1402 has been returned to the free list for subsequent use. In FIG. 14I, transmission of FC frames corresponding to context 4 1422 are complete, and context 4 is moved to the timer list to await reception of credit from the remote node. In FIG. 14J, transmission of the FC frames corresponding to context 3 1420 is completed, and context 3 is added to the timer list to await credit. In FIG. 14K, context 4 1422 experiences a credit timeout and is removed from the timer list and added to the completion list so that an indication of the error can be returned to the host. In this case, D_ID 8 is blocked, via an abort indication in the CAM, until the host received the error indication. Finally, in FIG. 14L, the transmission of the FC frames corresponding to context 2 1418 is complete and context 2 1418 is moved to the timer list to await credit. At the same time, credit has been received for context 3, and context 3 is placed in the tail position of the completion list. Note that the operations required to transition from the state shown in any of FIGS. 14A–K to the subsequent state shown in FIGS. 14B–L, respectively, can be accomplished in a single clock cycle.

Below, a C-like pseudo-code implementation of the CLM manipulator circuits is provided. This C-like pseudo-code fully specifies the circuitry and timing required to implement CLM processing of the various commands described above with reference to FIG. 13 and Tables 2–9.

A number of conventions are used in the following pseudo-code. The various signals corresponding to commands are designated in the pseudo-code with the signal names shown in Tables 2–9. The values of the head and tail pointers for the various lists are designated, in the pseudo-code, with a symbolic name comprising the prefix "curr_" followed by an abbreviation for the list, such as, for example, the abbreviation "tmr" for the timer list, followed by the suffix "_head" to designate the value of the head pointer or the suffix "_tail" to designate the value of the tail pointer of the list. The fields of a context are designated using familiar C language structure field syntax. For example, the link field of the contexts at the tail position of the timer list is designated "curr_tmr_tail.link."

In the pseudo-code, assignment statements assigning the value to link and reverse link fields occur using the following syntax:

next_ctx[cpm_clm_ctx_id.link]
   .rlink=cpm_clm_child_ctx;

The above assignment statement is executed by the completion list manipulator. The assignment statement symbolically represents an operation where the completion list manipulator will set the reverse link of the context referenced through a forward link by the context "cpm_clm_ctx_id," a signal input to the completion list manipulator, to reference the context indicated by the input signal "cpm_clm_child_ctx." The manipulator asserts signals indicating the values for the various link fields of the OSM linked lists for which the manipulator wishes to change the values during each clock cycle. The CLM responds to the various asserted signals from the different manipulators in a fixed precedence order so that linked list reference fields concurrently changed by multiple manipulators are serialized and so that the result of concurrent changes to particular reference values are predetermined and predictable. For example, in the case that four contexts may be managed by the OSM concurrently, the completion list manager may assert the following select signals to change the values of the reverse link fields of contexts 1–4:

cmp_1st_mnpltr_1r_sel
cmp_1st_mnpltr_2r_sel
cmp_1st_mnpltr_3r_sel
cmp_1st_mnpltr_4r_sel The logic circuitry of the completion list manager is designed to set one of the above select signals according to the following nested case statement in order to implement the above assignment statement:

```
case (cpm_clm_ctx_id)
   b000:   break;
   b001:
         case (curr_ctx_1_link)
            b000: break;
            b001: break;
            b010: cmp_1st_mnpltr_2r_sel = cpm_clm_child_ctx;
            break;
            b011: cmp_1st_mnpltr_3r_sel = cpm_clm_child_ctx;
            break;
```

```
                    b011: cmp_1st_mnpltr_4r_sel = cpm_clm_child_ctx;
                        break;
                    break;
            b010:
                case (curr_ctx_2_link)
                    b000: break;
                    b001: cmp_1st_mnpltr_1r_sel = cpm_clm_child_ctx;
                        break;
                    b010: break;
                    b011: cmp_1st_mnpltr_3r_sel = cpm_clm_child_ctx;
                        break;
                    b100: cmp_1st_mnpltr_4r_sel = cpm_clm_child_ctx;
                        break;
                    break;
            b011:
                case (curr_ctx_3_link)
                    b000: break;
                    b001: cmp_1st_mnpltr_1r_sel = cpm_clm_child_ctx;
                        break;
                    b010: cmp_1st_mnpltr_2r_sel = cpm_clm_child_ctx;
                        break;
                    b011: cmp_1st_mnpltr_3r_sel = cpm_clm_child_ctx;
                        break;
                    b100: break;
                    break;
```

Note that the notation "b" followed by a numeral comprising 1s and 0s indicates a binary number. For example, "b010" is the binary number expressed in base 10 notation as "2." Also note that "b000" stands for a NULL pointer or reference.

In the following pseudo-code, signals and signal buses will be designated in italics and the current values of head and tail pointers will be in bold font. Note that a set of signals, or a signal bus, is employed for logical signals that need to specify one of a number of possible values, or states, greater than two. For example, when n contexts are managed by the CLM, then a number of signal lines equal to $\log_2 n$ rounded to the next highest integer are required to specify a particular one of the n contexts. The pseudo-code for each manipulator will be provided separately. It should be noted that the psuedo-code for each manipulator represents the signals generated by the manipulator during a single clock cycle in response to any and all possible combinations of input signals received by the manipulator during the clock cycle. The pseudo-code is C-like, and contains sequential statements that, on a general processing computer, might be executed one after another or in groups of statements, one statement or group of statements per clock cycle. However, a manipulator "executes" all the statements during a single clock cycle. Thus, the psuedo-code for each manipulator expresses a design for a logic circuit that processes, in a highly parallel fashion, all the statements in a single clock cycle. It should be also noted that, in general, a manipulator may transfer only a single context from the linked list associated with the manipulator to a different linked list. However, a manipulator may need to concurrently add a number of contexts to the linked list associated with the manipulator, a situation corresponding to the manipulator concurrently receiving a number of commands from a number of OSM managers.

The pseudo-code for the timer list manipulator is provided below:

```
1  if (crm_clm_add_to_tx || crm_clm_add_to_comp ||
     crm_clm_add_to_nfab)
2  {
3      if(crm_clm_ctx_id == curr_tmr_head)
4      {
5          if(crm_clm_ctx_id.link)
6          {
7              next_tmr_1_head = crm_clm_ctx_id.link;
8              next_tmr_1_tail = curr_tmr_tail;
9              next_ctx[crm_clm_ctx_id.link].rlink = NULL
10         }
11         else
12         {
13             next_tmr_1_head = NULL;
14             nextr_tmr_1_tail = NULL;
15         }
16     }
17     else if (crm_clm_ctx_id == curr_tmr_tail)
18     {
19         next_tmr_1_head = curr_tmr_head;
20         next_tmr_1_tail = crm_clm_ctx_id.rlink;
21     }
22     else
23     {
24         next_tmr_1_head = curr_tmr_head;
25         next_tmr_1_tail = curr_tmr_tail;
26         next_ctx[crm_clm_ctx_id.rlink].link =
             crm_clm_ctx_id.link;
27         next_ctx[crm_clm_ctx_id.link].rlink =
             crm_clm_ctx_id.rlink;
28     }
29  }
30  else
31  {
32      next_tmr_1_head = curr_tmr_head;
33      next_tmr_1_tail = curr_tmr_tail;
34  }
35  if (next_tmr_1_tail)
36  {
37      next_ctx[next_tmr_1_tail].link =
38          tm_clm_add_to_tmr ? tm_clm_add_ctx : NULL;
39  }
40  if (tm_clm_add_to_tmr)
41  {
42      if (next_tmr_1_tail)
43      {
44          next_tmr_2_head = next_tmr_1_head;
45          next_tmr_2_tail = tm_clm_add_ctx;
46          next_ctm[tm_clm_add_ctx].rlink = next_tmr_1_tail;
47      }
48      else
49      {
50          next_tmr_2_head = tm_clm_add_ctx;
51          next_tmr_2_tail = tm_clm_add_ctx;
52          next_ctx[tm_clm_add_ctx] rlink = NULL;
53      }
54      next_ctx[tm_clm_add_ctx].link = NULL;
55  }
56  else
57  {
58      next_tmr_2_head = next_tmr_1_head;
59      next_tmr_2_tail = next_tmr_1_tail;
60  }
61  next_tmr_head = next_tmr_2_head;
62  next_tmr_tail = next_tmr_2_tail;
```

On line 1, the timer list manipulator determines whether any of the following credit manager signals have been asserted: crm_clm_add_to_tx, crm_clm_add_to_comp, or crm_clm_add_to_nfab. These signals represent commands issued to the CLM by the credit manager to add a context to the transmit list, completion list, or non-fabric list, respectively, as indicated in Table 5. An indication of the context to be moved in the case that the above signals are asserted is provided by the signal bus "crm_clm_ctx_id" as also indicated in Table 5. Thus, if any of the above three commands have been issued, then, on line 3, the timer list manipulator determines whether the context to be moved is the context at the head of the timer list. If so, then, on line 5, the timer list manipulator determines whether there is more than a single context on the timer list. If so, then on lines 7–9, the timer list manipulator sets local variables "next_timer_1_head" and "next_tmr_1_tail" to equal the values of the timer list head and tail references following removal of the first context on the timer list, and sets the reverse link of the resulting new head of the timer list to NULL. Otherwise, on lines 13 and 14, the timer list manipulator sets the local variables to NULL to indicate that the timer list will be empty following removal of the only context on the timer list. If the context to be removed from the timer list is at the tail of the timer list, and the timer list has more than one context, then the timer list manipulator sets the local variables to the values that the timer list head and tail references will have following removal of the tail context. Otherwise, the context to be removed is somewhere in the interior of the linked list, and the timer list manipulator executes lines 24–27 in order to remove the context from the middle of the list and splice the list together, and then sets the local variables to indicate that the head and tail reference pointers for the timer list will remain unchanged. Finally, if none of the above-described three signals have been asserted, then the timer list manipulator, on lines 32 and 33, sets the local variables to indicate that the timer list head and tail pointers will not be changed. On line 35, the timer list manipulator determines whether the timer list, following any manipulations indicated by signal assertions already handled, currently has a tail context. If so, then if a context is to be added to the timer list for the next clock cycle, the forward link field of that tail context is set to reference the context to be added to the timer list on lines 37 and 38. Otherwise, on line 38, the forward link for the tail context of the timer list is set to NULL. On line 40, the timer list manipulator determines whether a new context will be added to the timer list for the next clock cycle. If so, then if the timer list currently has a tail context, the timer list manipulator executes lines 44–46 to append the context to be added to the timer list to that tail, and sets local variables "next_tmr_2_head" and "next_tmr_2_tail" to indicate the new values for the head and tail pointers of the timer list. If the timer list does not have a tail, then the timer list manipulator executes lines 50–52 to add the context to be added to the timer list for the next clock cycle to the timer list. The forward link for the context to be added for the next clock cycle is set to NULL on line 54. Otherwise, if no context is to be added to the timer list for the next clock cycle, then the local variables are set to indicate that the head and tail pointers of the timer list will have the values determined prior to line 40. Finally, on lines 61 and 62, the timer list manipulator sets the local variables "next_tmr_head" and "next_tmr_tail" to the values that the timer list and tail pointers will have at the conclusion of the current clock cycle. Thus, the above pseudo-code representation of the timer list manipulator circuitry indicates the various operations that need to be performed by the timer list manipulator logic circuitry during each clock cycle.

Pseudo-code for the remaining manipulators will be provided below. This pseudo-code will employ the same conventions used in the timer list manipulator pseudo-code, but the textual description of the pseudo-code will be less detailed than that provided above for the timer list manipulator pseudo-code.

The pseudo-code representation of the free list manipulator circuitry is provided below:

```
1  if (om_clm_add_to_tx || om_clm_add_to_comp ||
2      om_clm_add_to_nfab || om_cm_chain_it)
3  {
4      if (om_add_ctx.link)
5      {
6          next_free_1_head = om_add_ctx.link;
7          next_free_1_tail = curr_free_tail;
8          next_ctx[om_add_ctx.link].rlink = NULL;
9      }
10     else
11     {
12         next_free_1_head = NULL;
13         next_free_1_tail = NULL;
14     }
15 }
16 else
17 {
18     next_free_1_head = curr_free_head;
19     next_free_1_tail = curr_free_tail;
20 }
21 if (cpm_clm_add_to_free || cpm_clm_dechain_to_tx ||
22     cpm_clm_dechain_to_comp || cpm_clm_dechain_to_nfab)
23 {
24     if (next_free_1_tail)
25     {
26         next_free_2_head = next_free_1_head;
27         next_free_2_tail = cpm_clm_ctx_id;
28         next_ctx [cpm_clm_ctx_id].rlink =
               next_free_1_tail;
29         next_ctx [next_free_1_tail].link =
               cpm_clm_ctx_id;
30     }
31     else
32     {
33         next_free_2_head = cpm_clm_ctx_id;
34         next_free_2_tail = cpm_clm_ctx_id;
35         next_ctx [cpm_clm_ctx_id].rlink = NULL;
36     }
37     next_ctx [cpm_clm_ctx_id].link = NULL;
38     next_clm_om_ctx_done = 1;
39     next_clm_om_ctx_id = cpm_clm_ctx_id;
40 }
41 else
42 {
43     next_free_2_head = next_free_1_head;
44     next_free_2_tail = next_free_1_tail;
45 }
46 next_free_head = next_free_2_head;
47 next_free_tail -= next_free_2_tail;
```

First, on line 1, the free list manipulator determines whether a context is to be moved from the free list to another list during the current clock cycle. If so, then local variables are used to store head and tail pointers for the free list following deletion of the context and if more than 1 context is on the free list, the next context after the context that is removed from the head of the list is updated to have a NULL reverse link. On line 21, the free list manipulator determines whether a context will be moved to the free list during the next clock cycle and if so, the subsequent lines 23–45 append the context to be moved to the free list to the tail of the free list. Finally, on lines 46 and 47, the head and tail pointers for the free list for the next clock cycle are assigned to local variables.

Pseudo-code describing operation of the non-fabric list manipulator is provided below:

```
1  if (nfd_clm_add_to_tx)
2  {
3      if (nfd_clm_add_ctx.link)
4      {
```

```
 5          next_nfab_1_head = nfd_clm_add_ctx.link;
 6          next_nfab_1_tail = curr_nfab_tail;
 7          next_ctx [nfd_clm_add_ctx.link].rlink = NULL;
 8       }
 9       else
10       {
11          next_nfab_1_head = NULL;
12          next_nfab_1_tail = NULL;
13       }
14    }
15    else
16    {
17       next_nfab_1_head = curr_nfab_head;
18       next_nfab_1_tail = curr_nfab_tail;
19    }
20    if (next_nfab_1_tail)
21    {
22       next_ctx [next_nfab_1_tail].link =
23          om_clm_add_to_nfab ? om_add_ctx :
24          rd_clm_add_to_nfab ? rd_clm_add_ctx :
25          crm_clm_add_to_nfab ? crm_clm_ctx_id :
26          cpm_clm_dechain_to_nfab ?
27             cpm_clm_child_ctx : NULL;
28    if (om_clm_add_to_nfab)
29    {
30       if (next_nfab_1_tail)
31       {
32          next_nfab_2_head = next_nfab_1_head;
33          next_nfab_2_tail = om_add_ctx;
34          next_ctx [om_add_ctx].rlink = next_nfab_1_tail;
35       }
36       else
37       {
38          next_nfab_2_head = om_add_ctx;
39          next_nfab_2_tail = om_add_ctx;
40          next_ctx [om_add_ctx].rlink = NULL;
41       }
42       next_ctx [om_add_ctx].link =
43          rd_clm_add_to_nfab ? rd_clm_add_ctx :
44          crm_clm_add_to_nfab ? crm_clm_ctx_id :
45          cpm_clm_dechain_to_nfab ?
46             cpm_clm_child_ctx : NULL;
47    else
48    {
49       next_nfab_2_head = next_nfab_1_head;
50       next_nfab_2_tail = next_nfab_1_tail;
51    }
52    if (rd_clm_add_to_nfab)
53    {
54       if (next_nfab_2_tail)
55       {
56          next_nfab_3_head = next_nfab_2_head;
57          next_nfab_3_tail = rd_clm_add_ctx;
58          next_ctx [rd_clm_add_ctx].rlink = next_nfab_2_tail;
59       }
60       else
61       {
62          next_nfab_3_head = rd_clm_add_ctx;
63          next_nfab_3_tail = rd_clm_add_ctx;
64          next_ctx [rd_clm_add_ctx].rlink = NULL;
65       }
66       next_ctx [rd_clm_add_ctx].link =
67          crm_clm_add_to_nfab ? crm_clm_ctx_id :
68          cpm_clm_dechain_to_nfab ?
69             cpm_clm_child_ctx : NULL;
70    else
71    {
72       next_nfab_3_head = next_nfab_2_head;
73       next_nfab_3_tail = next_nfab_2_tail;
74    }
75    if (crm_clm_add_to_nfab)
76    {
77       if (next_nfab_3_tail)
78       {
79          next_nfab_4_head = next_nfab_3_head;
80          next_nfab_4_tail = crm_clm_ctx_id;
81          next_ctx [crm_clm_ctx_id].rlink = next_nfab_3_tail;
82       }
83       else
84       {
85          next_nfab_4_head = crm_clm_ctx_id;
86          next_nfab_4_tail = crm_clm_ctx_id;
87          next_ctx [crm_clm_ctx_id].rlink = NULL;
88       }
89       next_ctx [crm_clm_ctx_id].link =
90          cpm_clm_dechain_to_nfab ?
91             cpm_clm_child_ctx : NULL;
92    else
93    {
94       next_nfab_4_head = next_nfab_3_head;
95       next_nfab_4_tail = next_nfab_3_tail;
96    }
97    if (cpm_clm_dechain_to_nfab)
98    {
99       if (next_nfab_4_tail)
100      {
101         next_nfab_5_head = next_nfab_4_head;
102         next_nfab_5_tail = cpm_clm_child_ctx;
103         next_ctx [cpm_clm_child_ctx].rlink =
104            next_nfab_4_tail;
105      }
106      else
107      {
108         next_nfab_5_head = cpm_clm_child_ctx;
109         next_nfab_5_tail = cpm_clm_child_ctx;
110         next_ctx [cpm_clm_child_ctx].rlink = NULL;
111      }
112      next_ctx [cpm_clm_child_ctx].link = NULL;
113   }
114   else
115   {
116      next_nfab_5_head = next_nfab_4_head;
117      next_nfab_5_tail = next_nfab_4_tail;
118   }
119   next_nfab_head = next_nfab_5_head;
120   next_nfab_tail = next_nfab_5_tail;
```

The non-fabric list manipulator prepares for moving the context from the non-fabric list to the transmit list for the next clock cycle on lines 1–19. If a new tail results from removal of a context, as detected on line 20, then the forward link of that tail context is updated to point to a new context to be added to the non-fabric list in the event that a new context will be added to the non-fabric list for the next clock cycle. Then, on lines 28–117, the non-fabric list manipulator determines which, if any, commands to add a context to the non-fabric list have been issued, and prepares to add contexts corresponding to any issued commands to the non-fabric list for the next clock cycle. Finally, on lines 118–119, local variables are set to indicate the values of the head and tail pointers of the non-fabric list for the next clock cycle.

The pseudo-code that describes the transmit list manipulator logic circuitry is provided below:

```
 1 if (tm_clm_add_to_tmr || tm_clm_add_to_comp)
 2 {
 3    if (tm_clm_add_ctx == curr_tx_head)
 4    {
 5       if (tm_clm_add_ctx.link)
 6       {
 7          next_tx_1_head = tm_clm_add_ctx.link;
 8          next_tx_1_tail = curr_tx_tail;
 9          next_ctx [tm_clm_add_ctx.link].rlink = NULL;
10       }
11       else
12       {
```

```
13              next_tx_1_head = NULL;
14              next_tx_1_tail = NULL;
15          }
16      }
17      else if (tm_clm_add_ctx == curr_tx_tail)
18      {
19          next_tx_1_head = curr_tx_head;
20          next_tx_1_tail = tm_clm_add_ctx.rlink;
21      }
22      else
23      {
24          next_tx_1_head = curr_tx_head;
25          next_tx_1_tail = curr_tx_tail;
26          next_ctx [tm_clm_add_ctx.rlink].link =
                tm_clm_add_ctx.link;
27          next_ctx [tm_clm_add_ctx.link].rlink =
                tm_clm_add_ctx.rlink;
28      }
29  }
30  else
31  {
32      next_tx_1_head = curr_tx_head;
33      next_tx_1_tail = curr_tx_tail;
34  }
35  if (next_tx_1_tail)
36  {
37      next_ctx [next_tx_1_tail].link =
38          cpm_clm_dechain_to_tx ? cpm_clm_child_ctx :
39          crm_clm_add_to_tx ? crm_clm_ctx_id :
40          om_clm_add_to_tx ? om_add_ctx :
41          rd_clm_add_to_tx ? rd_clm_add_ctx :
42          nfd_clm_add_to_tx ? nfd_clm_add_ctx : NULL;
43  }
44  if (cpm_clm_dechain_to_tx)
45  {
46      if (next_tx_1_tail)
47      {
48          next_tx_2_head = next_tx_1_head;
49          next_tx_2_tail = cpm_clm_child_ctx;
50          next_ctx [cpm_clm_child_ctx].rlink =
                next_tx_1_tail;
51      }
52      else
53      {
54          next_tx_2_head = cpm_clm_child_ctx;
55          next_tx_2_tail = cpm_clm_child_ctx;
56          next_ctx [cpm_clm_child_ctx].rlink = NULL;
57      }
58      next_ctx [cpm_clm_child_ctx].link =
59          crm_clm_add_to_tx ? crm_clm_ctx_id :
60          om_clm_add_to_tx ? om_add_ctx :
61          rd_clm_add_to_tx ? rd_clm_add_ctx :
62          nfd_clm_add_to_tx ? nfd_clm_add_ctx : NULL;
63  }
64  else
65  {
66      next_tx_2_head = next_tx_1_head;
67      next_tx_2_tail = next_tx_1_tail;
68  }
69  if (crm_clm_add_to_tx)
70  {
71      if (next_tx_2_tail)
72      {
73          next_tx_3_head = next_tx_2_head;
74          next_tx_3_tail = crm_clm_ctx_id;
75          next_ctx [crm_clm_ctx_id].rlink = next_tx_2_tail;
76      }
77      else
78      {
79          next_tx_3_head = crm_clm_ctx_id;
80          next_tx_3_tail = crm_clm_ctx_id;
81          next_ctx [crm_clm_ctx_id].rlink = NULL;
82      }
83      next_ctx [crm_clm_ctx_id].link =
84          om_clm_add_to_tx ? om_add_ctx :
85          rd_elm_add_to_tx ? rd_clm_add_ctx :
86          nfd_clm_add_to_tx ? nfd_clm_add_ctx : NULL;
87  }
88  else
89  {
90      next_tx_3_head = next_tx_2_head;
91      next_tx_3_tail = next_tx_2_tail;
92  }
93  if (om_clm_add_to_tx)
94  {
95      if (next_tx_3_tail)
96      {
97          next_tx_4_head = next_tx_3_head;
98          next_tx_4_tail = om_add_ctx;
99          next_ctx [om_add_ctx].rlink = next_tx_3_tail;
100     }
101     else
102     {
103         next_tx_4_head = om_add_ctx;
104         next_tx_4_tail = om_add_ctx;
105         next_ctx [om_add_ctx].rlink = NULL;
106     }
107     next_ctx [om_add_ctx].link =
108         rd_clm_add_to_tx ? rd_clm_add_ctx :
109         nfd_clm_add_to_tx ? nfd_clm_add_ctx : NULL;
110 }
111 else
112 {
113     next_tx_4_head = next_tx_3_head;
114     next_tx_4_tail = next_tx_3_tail;
115 }
116 if (rd_clm_add_to_tx)
117 {
118     if (next_tx_4_tail)
119     {
120         next_tx_5_head = next_tx_4_head;
121         next_tx_5_tail = rd_clm_add_ctx;
122         next_ctx [rd_clm_add_ctx].rlink = next_tx_4_tail;
123     }
124     else
125     {
126         next_tx_5_head = rd_clm_add_ctx;
127         next_tx_5_tail = rd_clm_add_ctx;
128         next_ctx [rd_clm_add_ctx].rlink = NULL;
129     }
130     next_ctx [rd_clm_add_ctx].link =
131         nfd_clm_add_to_tx ? nfd_clm_add_ctx : NULL;
132 }
133 else
134 {
135     next_tx_5_head = next_tx_4_head;
136     next_tx_5_tail = next_tx_4_tail;
137 }
138 if (nfd_clm_add_to_tx)
139 {
140     if (next_tx_5_tail)
141     {
142         next_tx_6_head = next_tx_5_head;
143         next_tx_6_tail = nfd_clm_add_ctx;
144         next_ctx [nfd_clm_add_ctx].rlink = next_tx_5_tail;
145     }
146     else
147     {
148         next_tx_6_head = nfd_clm_add_ctx;
149         next_tx_6_tail = nfd_clm_add_ctx;
150         next_ctx [nfd_clm_add_ctx].rlink = NULL;
151     }
152     next_ctx [nfd_clm_add_ctx].link = NULL;
153 }
154 else
155 {
156     next_tx_6_head = next_tx_5_head;
157     next_tx_6_tail = net_tx_5_tail;
158 }
159 next_tx_head = next_tx_6_head;
160 next_tx_tail = next_tx_6_tail;
```

First, the transmit list manipulator, on lines 1–34, determines whether or not any contexts are to be removed from the transmit list for the next clock cycle, and, if so, prepares for the removal of a context. If, as a result of removing a context from the transmit list, there is a new tail context to the transmit list, then the forward link for that tail is updated on lines 37–43. Then, on lines 44–157, the transmit list manipulator detects any signal indicating issuance of commands to add contexts to the transmit list and updates the transmit list and contexts accordingly. Finally, on lines 158–159, the transmit list manipulator sets the local variables to the values for the transmit list head and tail pointer for the next clock cycle.

Pseudo-code illustrating the functionality embodied in the completion list manager logic circuitry is provided below:

```
1    if (cpm_clm_add_to_free || cpm_clm_dechain_to_tx ||
2        cpm_clm_dechain_to_comp || cpm_clm_dechain_to_nfab)
3    {
4        if (cpm_clm_ctx_id.link)
5        {
6            next_cmp_1_head = cpm_clm_ctx_id.link;
7            next_cmp_1_tail = curr_cmp_tail;
8            next_ctx [cpm_clm_ctx_id.link].rlink =
9                cpm_clm_dechain_to_comp ?
                 cpm_clm_child_ctx : NULL;
10       }
11       else
12       {
13           next_cmp_1_head = NULL;
14           next_cmp_1_tail = NULL;
15       }
16   }
17   else
18   {
19       next_cmp_1_head = curr_cmp_head;
20       next_cmp_1_tail = curr_cmp_tail;
21   }
22   if (cpm_clm_dechain_to_comp)
23   {
24       if (next_cmp_1_head)
25       {
26           next_cmp_2_head = cpm_clm_child_ctx;
27           next_cmp_2_tail = next_cmp_1_tail;
28           next_ctx [cpm_clm_child_ctx].link =
                 cpm_clm_ctx_id.link;
29       }
30       else
31       {
32           next_cmp_2_head = cpm_clm_child_ctx;
33           next_cmp_2_tail = cpm_clm_child_ctx;
34       }
35   }
36   else
37   {
38       next_cmp_2_head = next_cmp_1_head;
39       next_cmp_2_tail = next_cmp_1_tail;
40   }
41   if (next_cmp_2_tail)
42   {
43       next_ctx [next_cmp_2_tail].link =
44           crm_clm_add_to_comp ? crm_clm_ctx_id :
45           tm_clm_add_to_comp ? tm_clm_add_ctx :
46           om_clm_add_to_comp ? om_add_ctx : NULL;
47   }
48   if (crm_clm_add_to_comp)
49   {
50       if (next_cmp_2_tail)
51       {
52           next_cmp_3_head = next_cmp_2_head;
53           next_cmp_3_tail = crm_clm_ctx_id;
54           next_ctx [crm_clm_ctx_id].rlink = next_cmp_2_tail;
55       }
56       else
57       {
58           next_cmp_3_head = crm_clm_ctx_id;
59           next_cmp_3_tail = crm_clm_ctx_id;
60           next_ctx [crm_clm_ctx_id].rlink = NULL;
61       }
62       next_ctx [crm_clm_ctx_id].link =
63           tm_clm_add_to_comp ? tm_clm_add_ctx :
64           om_clm_add_to_comp ? om_add_ctx : NULL;
65   }
66   else
67   {
68       next_cmp_3_head = next_cmp_2_head;
69       next_cmp_3_tail = next_cmp_2_tail;
70   }
71   if (tm_clm_add_to_comp)
72   {
73       if (next_cmp_3_tail)
74       {
75           next_cmp_4_head = next_cmp_3_head;
76           next_cmp_4_tail = tm_clm_add_ctx;
77           next_ctx [tm_clm_add_ctx].rlink = next_cmp_3_tail;
78       }
79       else
80       {
81           next_cmp_4_head = tm_clm_add_ctx;
82           next_cmp_4_tail = tm_clm_add_ctx;
83           next_ctx [tm_clm_add_ctx].rlink = NULL;
84       }
85       next_ctx [tm_clm_add_ctx].link =
86           om_clm_add_to_comp ? om_add_ctx : NULL;
87   }
88   else
89   {
90       next_cmp_4_head = next_cmp_3_head;
91       next_cmp_4_tail = next_cmp_3_tail;
92   }
93   if (om_clm_add_to_comp)
94   {
95       if (next_cmp_4_tail)
96       {
97           next_cmp_5_head = next_cmp_4_head;
98           next_cmp_5_tail = om_add_ctx;
99           next_ctx [om_add_ctx].rlink = next_cmp_4_tail;
100      }
101      else
102      {
103          next_cmp_5_head = om_add_ctx;
104          next_cmp_5_tail = om_add_ctx;
105          next_ctx [om_add_ctx].rlink = NULL;
106      }
107      next_ctx [om_add_ctx].link = NULL;
108  }
109  else
110  {
111      next_cmp_5_head = next_cmp_4_head;
112      next_cmp_5_tail = next_cmp_4_tail;
113  }
114  next_cmp_head = next_cmp_5_head;
115  next_cmp_tail = next_cmp_5_tail;
```

The completion list manager, on lines 1–21, determines whether the context will be moved from the completion list for the next clock cycle and, if so, prepares to update the completion list head and tail pointers and any contexts to effect deletion of the contexts from the completion list. Then on lines 22–40, the completion list manipulator determines whether, because of de-chaining of a context, the child context needs to be inserted at the head of the completion list and, if so, prepares for insertion of the child context to the head of the completion list. If, as a result of a removal of a context from the completion list, there is a new tail context for the completion list during the next clock cycle, the forward link for that new tail is updated on lines 41–47. Finally, the completion list manipulator, on lines 48–113, determines which, if any, signals have been asserted by OSM managers to the CLM to add contexts to the completion list and, for any asserted signals, the completion list manipulator effects the necessary changes to the head and tail pointers for the completion list and any contexts within or added to the completion list. Finally, on lines 114–115, the completion list manipulator sets local variables to values for the head and tail pointers of the completion list for the next cycle.

Pseudo-code representing operations conducted by the chain handler during a single clock cycle is provided below:

```
1    if (cpm_clm_dechain_to_tx || cpm_clm_dechain_to_comp ||
2        cpm_clm_dechain_to_nfab)
3    {
4        next_ctx [cpm_clm_ctx_id].chain = NULL;
5    }
6    if (om_clm_chain_it)
7    {
8        next_ctx [om_parent_ctx].chain = om_add_ctx;
9        next_ctx [om_add_ctx].link = NULL;
10   }
11   if (rd_clm_add_to_tx || rd_clm_add_to_nfab)
12   {
13       next_ctx [curr_free_tail].chain = NULL;
14   }
```

The chain handler detects, on lines 1 and 2, whether any of the de-chain commands have been issued and, if so, knows the chain reference of the parent context of the chain to move all children contexts from the parent chain for. Then, on lines 6–10, the chain handler handles an ODB manager's request to chain a context, if the chain command has been asserted by the ODB manager. Then, on lines 11–14, the chain handler handles the case where the rogue daemon moves a context out of the free list.

Although the present invention has been described in terms of a particular embodiment, it is not intended that the invention be limited to this embodiment. Modifications within the spirit of the invention will be apparent to those skilled in the art. For example, the method of the present invention may be applied to any of the different interface-controller subcomponents of an FC interface controller, or may be more generally applied to any hardware controller. As pointed out above, many of the different common data structures employed in software programming may be used in place of linked lists when the various operations commonly performed by a controller on the data structure associated with the controller are more suitably implemented using a different type of data structure than a linked list. The logic circuits are described above in C-like pseudo-code, but the logic circuit design may be specified in any number of different logic circuit design languages, programming languages, or logical circuit design representations. The above implementation is centered around specifying operations for the various logic circuits partitioned from the OSM that are required to be executed during a single clock cycle. However, the design may instead focus on operations required to be executed during some number of clock cycles, or by some other period of time, either constant or varying, detectable by the hardware circuitry. In the above implementation, contexts include many unspecified fields that hold data transferred to the context from an ODB. In implementations of other types of hardware controllers, different fields may be employed to store different types of information. In the above-described implementation, the contexts are stored in a logical array of contexts, and linked-lists are implemented using registers that store small integer indexes into the array of contexts. Many different types of implementations of linked-list data structures are possible, and many implementations of various other data structures, such as FIFO queues, stacks, acyclic graphs, last-in/first-out queues, and other common data structures, are possible. A hardware controller or sub-controller may be designed to operate on any number of different contexts concurrently.

The foregoing description, for purposes of explanation, used specific nomenclature to provide a thorough understanding of the invention. However, it will be apparent to one skilled in the art that the specific details are not required in order to practice the invention. In other instances, well-known circuits and devices are shown in block diagram form in order to avoid unnecessary distraction from the underlying invention. Thus, the foregoing descriptions of specific embodiments of the present invention are presented for purposes of illustration and description; they are not intended to be exhaustive or to limit the invention to the precise forms disclosed, obviously many modifications and variations are possible in view of the above teachings. The embodiments were chosen and described in order to best explain the principles of the invention and its practical applications and to thereby enable others skilled in the art to best utilize the invention and various embodiments with various modifications as are suited to the particular use contemplated. It is intended that the scope of the invention be defined by the following claims and their equivalents:

What is claimed is:

1. A method for implementing a hardware controller that concurrently executes a number of tasks by carrying out operations on behalf of the tasks, the method comprising:
   determining a format for a context, comprising stored information related to a task, that represents the task;
   determining possible states, and transitions between states, that a context representing a task currently executed by the hardware controller can occupy at each point in the execution of the task, transitions representing operations performed on behalf of a task by the hardware controller;
   partitioning the states and operations carried out by the hardware controller into a number of managers each containing a number of related states and carrying out a number of operations;
   associating each manager with a data structure for storing contexts occupying states contained by the manager;
   defining a data-structure-manipulator manager that implements the data structures and that transfers contexts from one data structure to another;
   defining a command interface to the data-structure-manipulator manager for each manager; and
   implementing the managers and data-structure-manipulator manager, according to the determined states and transitions, so that, when a first manager carries out an operation that results in transition of a context to a state contained in a second manager, the first manager generates a command to the data-structure-manipulator manager to transfer the context from the data structure associated with the first manager to the data structure associated with the second manager such that timing of the hardware controller is controlled by a clock circuit that generates clock signals that define clock cycles, wherein each logical manager may issue at most one command to the data-structure manipulator during each clock cycle, and wherein the data-structure manipulator concurrently executes commands issued by the logical managers during a clock cycle by serializing the commands according to a defined precedence ordering of the commands.

2. The method of claim 1 wherein tasks are provided to the hardware controller via a signal interface, wherein the hardware controller generates output signals and output data as a result of execution of a task, and wherein operations carried out by managers can be invoked via a signal interface provided for each manager.

3. The method of claim 1 wherein the data-structure-manipulator manager comprises a manipulator logic circuit for each manager, a manipulator logic circuit for a manager together with the command interface defined for the manager composing a manipulator within the data-structure-manipulator manager corresponding to the manager.

4. The method of claim 3 wherein the hardware controller includes a timing circuit that generates clock signals at regular intervals, the intervals including and following a first clock signal and preceding a next clock signal composing a clock cycle, wherein each manager can issue a single command to the manipulator associated with the manager during a single clock cycle, and wherein each manipulator can receive a number of contexts during a single clock cycle for transfer to the data structure associated with the manager corresponding to the manipulator.

5. The method of claim 4 wherein each manipulator can receive a number of commands from a number of managers during each clock cycle.

6. The method of claim 5 wherein related contexts can be linked to one another to form a chain of related contexts that can be transferred together by transferring the first context of the chain of related contexts.

7. The method of claim 6 applied to an outbound sequence manager functionality of a fibre channel interface controller to implement an outbound sequence manager having contexts that store information supplied to the outbound sequence manager in outbound descriptor blocks and having doubly linked-list data structures associated with each manager for storing contexts occupying states contained in the manager, the outbound sequence manager comprising:
  a completion manager associated with a completion doubly linked-list;
  a credit manager associated with a timer doubly linked-list;
  a transmit manager associated with a transmit doubly linked-list;
  an outbound descriptor block manager associated with a free doubly linked-list;
  a rogue manager associated with a free doubly linked-list;
  a non-fabric daemon manager associated with a non-fabric doubly linked-list; and
  a centralized list manager data-structure-manipulator manager that transfers contexts from one doubly linked-list to another in response to commands issued to the centralized list manager by the completion manager, credit manager, transmit manager, outbound descriptor manager, rogue manager, and non-fabric daemon, the centralized list manager having a timer list manipulator, a free list manipulator, a non-fabric list manipulator, a transmit list manipulator, and a completion list manipulator.

8. A method for implementing a hardware controller that concurrently executes a number of tasks, the method comprising:
  representing each task executed by the hardware controller as a context, each context occupying a state determined by the contents of at least one field within the context, a context transitioning from one state to another state when the hardware controller carries out an operation on behalf of the task represented by the context, wherein timing of the hardware controller is controlled by a clock circuit that generates clock signals that define clock cycles, wherein each logical manager may issue at most one command to the data-structure manipulator during each clock cycle, and wherein the data-structure manipulator concurrently executes commands issued by the logical managers during a clock cycle by serializing the commands according to a defined precedence ordering of the commands;
  partitioning hardware controller operations and associated context states into a number of logical managers;
  associating each logical manager with one of a number logical data structures for storing contexts occupying states within the logical manager; and
  implementing the logical managers and a data-structure manipulator that contains the contexts, logical data structures, and a command interface through which each logical manager issues commands to direct the data-structure manipulator to transfer a context from the data structure associated with the logical manager to a different data structure.

9. The method of claim 8 wherein the data structures are chosen for efficient storage and retrieval of contexts according to the operations carried out by one or more logical managers associated with the contexts, the data structures chosen from among well-known data structures employed in software programming, including:
  singly linked lists;
  doubly linked lists;
  first-in-first-out queues;
  first-in-last-out queues;
  stacks;
  Graphs;
  acyclic graphs, such as binary trees;
  arrays;
  circular queues; and
  combinations of the well-known data structures.

10. The method of claim 8 wherein each logical manager is associated with a signal interface for input and output of signals, wherein operations carried out by logical managers are invoked by signals received through the signal interfaces, and wherein the hardware controller receives tasks and control signals and output data and control signals though a hardware controller interface.

11. The method of claim 10 wherein the hardware controller receives a task via the hardware controller interface and executes the task by:
  storing information related to the task within the hardware controller and initializing a context to represent the task;
  adding the context to the data structure;
  carrying out operations on behalf of the context by the logical manager associated with the data structure in which the context is located, and, when carrying out an operation by a first logical manager results in transition of the context to a state in a second logical manager associated with a different data structure than the data structure in which the context is located, issuing a command from the first logical manager to the data-structure manipulator to transfer the context to the different data structure; and
  when all operations that need to be carried out by the hardware controller to execute the task are carried out, generating output data and output signals corresponding to completion of the task by the hardware controller and freeing the context for representing a subsequently received task.

12. A subcomponent controller within a communication controller comprising:
- data storage elements that together compose a number of contexts for storing information related to a sequence of data to be exchanged through a communications medium connected to the communication controller;
- logical managers that are each associated with a data structure and that each carries out operations on behalf of contexts stored within the associated data structure, wherein each logical manager may issue a single context transfer command during a single clock cycle, wherein the data-structure manipulator can concurrently receive and carry out one transfer command received from each logical manager during a single clock cycle, wherein the data-structure manipulator serializes all commands received during a single clock cycle by carrying out the commands logically in a predetermined precedence order; and
- a data-structure manipulator that implements a number of data structures for storing contexts and that transfer contexts between data structures in response to receiving transfer commands from the logical managers.

13. The subcomponent controller of claim 12 wherein the subcomponent interfaces with external subcomponent controllers via a signal interface and wherein the subcomponent controller receives timing signals at regular intervals that define clock cycles.

14. The subcomponent controller of claim 12 wherein the communications controller is a fibre channel interface controller and wherein the communications medium is a fibre channel communications medium.

15. The subcomponent controller of claim 14 wherein the subcomponent controller is an outbound sequence manager that receives outbound descriptor blocks from an external subcomponent, stores information related to an outbound sequence and represents a received outbound sequence with a context, and that provides fibre channel frames to an external subcomponent for transmission to the fibre channel medium as a result of executing a task corresponding to a received outbound descriptor block.

16. The subcomponent controller of claim 15 wherein the data structures are doubly linked lists of contexts in which each context may reference a single linked list of related contexts.

17. The subcomponent controller of claim 16 wherein the logical managers include:
- a completion manager associated with a completion list;
- a credit manager associated with a timer list;
- a transmit manager associated with a transmit list;
- an outbound descriptor block manager associated with a free list;
- a rogue manager associated with a free list;
- a non-fabric daemon manager associated with a non-fabric list; and
- a centralized list manager that serves as the data-structure manipulator to transfer contexts between lists.

18. The subcomponent controller of claim 17 wherein:
- the completion manager can issue commands to the centralized list manager to transfer a context from the completion list to the free list, to transfer a first context from the completion list to the free list and dechain related contexts from the first context and transfer the related contexts to the transmit list, to transfer a first context from the completion list to the free list and dechain related contexts from the first context and transfer related contexts to the completion list, and to transfer a first context from the completion list to the free list and to dechain related contexts from the first context and transfer related contexts to the non-fabric list;
- the credit manager can issue commands to the centralized list manager to transfer a context from the timer list to the transmit list, non-fabric list, or the completion list;
- the transmit manager can issue commands to the centralized list manager to transfer a context from the transmit list to the timer list or the completion list;
- the outbound descriptor block manager can issue commands to the centralized list manager to transfer a context from the free list to the transmit list of the non-fabric list; and
- the non-fabric daemon can issue commands to the centralized list manager to transfer a context from the non-fabric list to the transmit list.

* * * * *